United States Patent [19]

Hartman

[11] 4,156,926

[45] May 29, 1979

[54] PROM CIRCUIT BOARD PROGRAMMER

[75] Inventor: Iliff N. Hartman, Garland, Tex.

[73] Assignee: Texas Instruments Incorporated, Dallas, Tex.

[21] Appl. No.: 691,651

[22] Filed: Jun. 1, 1976

[51] Int. Cl.² .................. G05B 19/24; G06F 9/12; G06F 9/19
[52] U.S. Cl. .................................. 364/900
[58] Field of Search ............. 340/172.5; 445/1; 364/200 MS File, 900 MS File

[56] References Cited

U.S. PATENT DOCUMENTS

| | | | |
|---|---|---|---|
| 3,585,605 | 6/1971 | Gardner et al. | 340/172.5 |
| 3,602,899 | 8/1971 | Lindquist et al. | 340/172.5 |
| 3,689,893 | 9/1972 | Taddei | 340/172.5 |
| 3,720,920 | 3/1973 | Watson et al. | 340/172.5 |
| 3,736,574 | 5/1973 | Gersbach | 364/200 |
| 3,755,791 | 8/1973 | Arzubi | 364/200 |
| 3,786,434 | 1/1974 | Frye et al. | 340/172.5 |
| 3,978,456 | 8/1976 | Moran | 340/172.5 |
| 3,988,717 | 10/1976 | Kisylia | 340/172.5 |
| 3,990,052 | 11/1976 | Gruner | 340/172.5 |
| 4,028,678 | 6/1977 | Moran | 364/900 |
| 4,028,684 | 6/1977 | Divine et al. | 364/900 |
| 4,037,090 | 7/1977 | Raymond | 364/200 |
| 4,037,212 | 7/1977 | Moniya et al. | 364/200 |
| 4,048,624 | 9/1977 | Cochran et al. | 364/900 |
| 4,050,096 | 9/1977 | Bennett et al. | 364/200 |
| 4,056,711 | 11/1977 | Lamar | 364/200 |
| 4,068,299 | 1/1978 | Bachman | 364/200 |

Primary Examiner—Gareth D. Shaw
Assistant Examiner—Jan E. Rhoads
Attorney, Agent, or Firm—Rene' E. Grossman; Stephen S. Sadacca

[57] ABSTRACT

A PROM programmer programs an array of PROMs mounted on a circuit board. The PROM chips are selectively addressed by energization of the respective chip with a high write voltage or a low read voltage while an individual cell is addressed. A control unit controls the flow of data into and out of the circuit board via a memory buffer unit.

11 Claims, 16 Drawing Figures

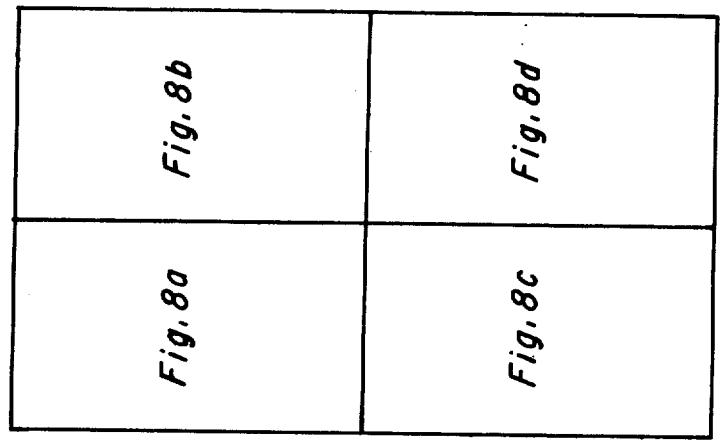
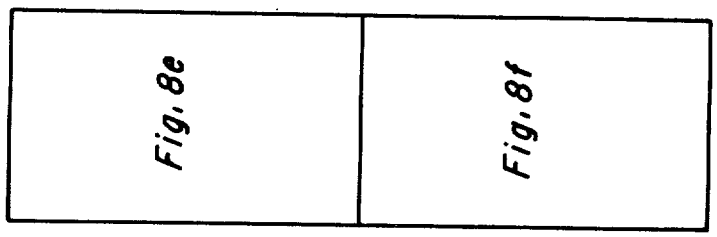
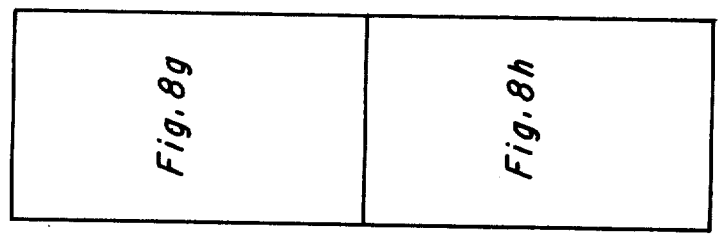
Fig. 8

PROM CIRCUIT BOARD PROGRAMMER

BACKGROUND OF THE INVENTION

This invention relates to PROM programmers and more particularly to a PROM programmer which programs a plurality of proms mounted on a circuit board.

Programmable PROMs, both bipolar and MOS, are well known in the art. These circuits are generally programmed by applying a selective, generally high, voltage to a memory element at a selectively addressed location causing some malfunction in the cell such as open circuiting a fuse or semiconductor junction, thereby selectively altering the cell to provide a binary state opposite to the original stored signal.

Heretofore, such programming of PROM circuits was done on an individual basis. This process is slow and in the case of mass production, all chips to be programmed at a given work station are generally programmed with the same set of data or program. In order to produce, for example, a number of circuit boards, each contining 16 PROMs with each of the PROMs containing a different set of data or program, either 16 programming machines are necessary or the program of a single machine would have to be changed as many as 16 times or some combination of these.

It is, therefore, an object of the present invention to provide an improved PROM programmer.

It is another object of the invention to provide a PROM programmer which is capable of programming a plurality of PROMs, each with a different set of data or program instructions in a single operation.

It is a further object of the invention to provide a programmer which programs PROMs while such PROMs are mounted on a circuit board, the circuit board being suitable for mounting in an end product in which the PROMs are required for operation.

Still another object of the invention is to provide a multiple PROM programmer with error checking and correction capabilities.

Still a further object of the invention is to provide a prom programmer which interfaces with a stored program industrial to copy a stored program from the controller to a multi-PROM circuit board for permanent storage, provide a stored program to a RAM memory system controller, provide a duplicate circuit board for a similar industrial controller and/or provide a replacement for a RAM memory system in the industrial controller.

These and other objects are accomplished in accordance with the present invention in which a PROM programmer is adapted to receive multi-PROM circuit boards and is capable of programming all of the PROMs mounted on the circuit board, each with a different program or data set, in a single operation. The PROM programmer is comprised of a memory buffer unit for receiving data from a stored program industrial controller or some other source in a particular manner, i.e., serially and temporarily storing such data until the PROMs on the circuit board have been programmed. A memory buffer unit also provides address signals for addressing the PROMs on the circuit board; the high order address bits are utilized for chip selection by means of a chip select circuit and the low order bits are utilized for addressing the individual memory cell on the selected PROM chip. A controlled dual voltage supply provides high (write) or low (read) energizing voltage to the selected PROM by means of the chip select circuit, thereby automatically programming or reading the selected cell of the selected PROM. This feature is significant because the PROMs may not have chip enable inputs and because the programming function is often applied via the same (Vcc) pin which ordinarily supplies relatively low operating voltage to the chip in the read mode after programming is complete. In one embodiment, a hard wired set of bits on the circuit board indicates to the PROM programmer the number of PROMs to be programmed and a similar indicator is provided by the stored program industrial controller or other data source indicating to the PROM programmer of memory chips in the controller which will be sending or receiving data from the PROM programmer. In that manner, circuit boards containing different numbers of PROMs are programmed. A control unit controls the flow of data through the memory buffer unit and sequences the operation of the PROM programmer.

BRIEF DESCRIPTION OF THE DRAWINGS

Still further objects and advantages will be apparent from the detailed description and claims when read in conjunction with the accompanying drawings in which:

FIG. 8 is a map of FIGS. 8a-h.

TABLE I shows in detail the code stored in the control ROM of the control unit;

TABLE II shows the code stored in the output #1 ROM of the control unit;

TABLE III shows the code stored in the output #2 ROM of the control unit; and

TABLE IV shows the code stored in the jump/timer ROM of the control unit.

DETAILED DESCRIPTION OF PREFERRED EMBODIMENTS

Figure 1:
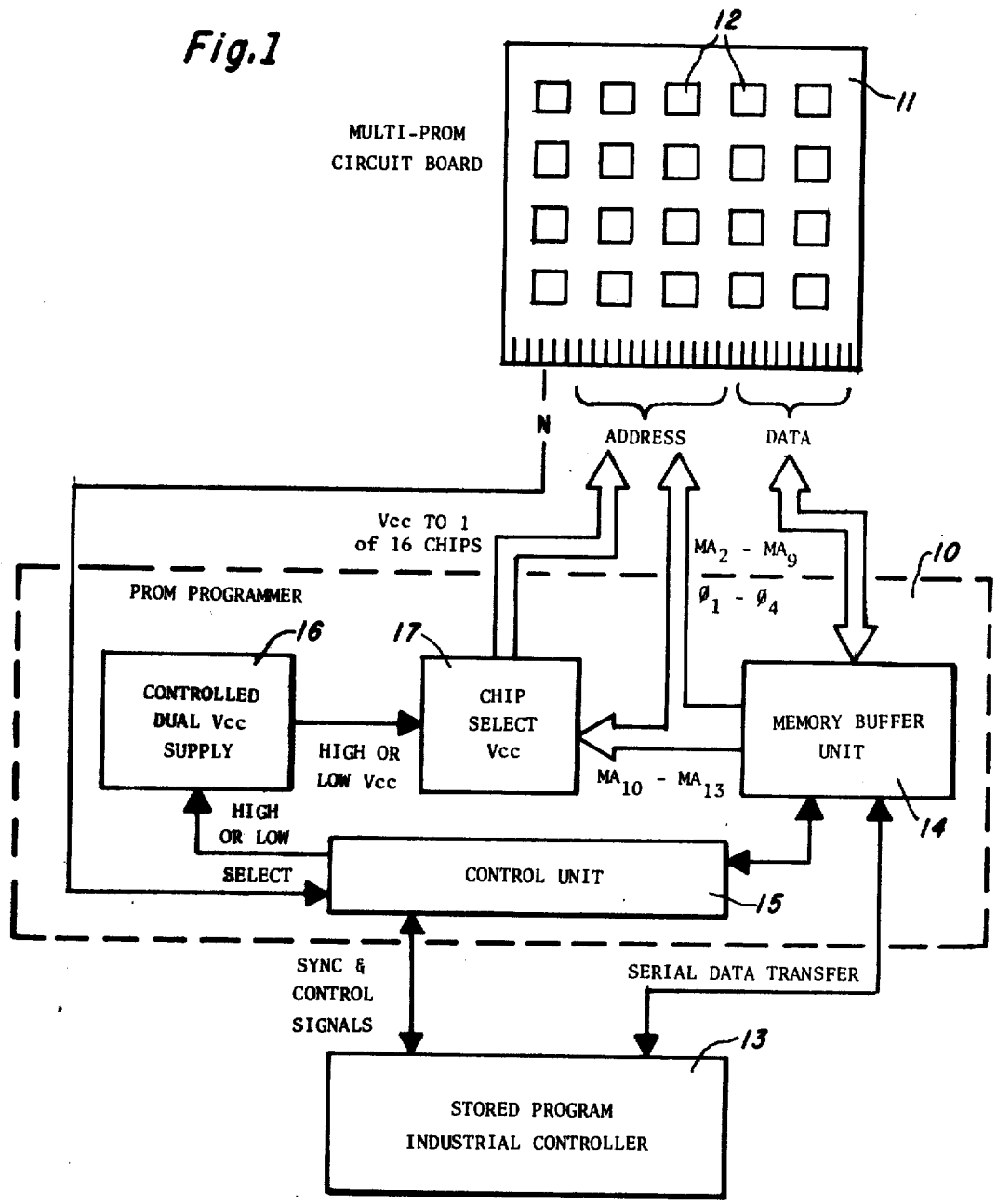
FIG. 1 is a block diagram of the PROM programmer in accordance with the present invention.

Referring then to the drawings, and particularly to the block diagram of FIG. 1, a PROM programmer 10, embodying the present invention is shown.

PROM programmer 10 is comprised of a memory buffer unit 14 which transfers data to and from a data source/receiver such as the memory of a stored program industrial controller 13, and to and from a multi-PROM circuit board or logic card 11. Memory buffer unit 14 provides temporary buffer storage for the data as well as proper interfacing for the particular mode of data transfer required for the particular application. For example, in the present embodiment, data is transferred between memory buffer unit 14 and stored program industrial controller 13 as a serial data stream and between the memory buffer unit 14 and PROMs 12 as a 4 bit parallel word.

Thus, during a first mode, data is serially transferred from the data source/receiver such as controller 13, and stored in a buffer memory. The stored program industrial controller 13 may be, for example, a 5 TI programmable controller sold by Texas Instruments Incorporated, the assignee of the present invention, which is described in detail in U.S. Pat. No. 3,953,834. Sync and control signals are provided by the stored program industrial controller 13 to control unit 15 to synchronize the data transfer. Once the data has been stored in memory buffer unit 14, all further synchronization and control is generated internally by control unit 15 and by addressing circuitry of the memory buffer unit 14.

In a second mode, the PROMs 12 of a logic card 11 are programmed with the data stored in the buffer memory of memory buffer unit 14. Memory buffer unit 14 provides means for generating addresses for the multi-PROM circuit board $MA_0$–$MA_1$ ($\theta_1$–$\theta_4$), $MA_2$–$MA_9$ and $MA_{10}$–$MA_{13}$. Control unit 15 generates a signal indicating to controlled dual Vcc power supply 16 whether to provide a high eleven volt (write) signal for altering the predetermined state of an addressed cell or a low five volt (read) signal to chip select Vcc logic circuitry 17 for reading the contents of a cell. The high order address bits $MA_{10}$–$MA_{13}$ are provided to chip select circuitry 17 which then routes the high or low Vcc signal from supply 16 to one of the, for example, 16 chips mounted on multi-PROM circuit board 11. The low order address bits $MA_0$–$MA_9$ address the particular word and cell of the selected PROM to be written or read.

In a third mode, the data stored in the already programmed PROMs 12 of a multi-PROM circuit board 11 are transferred to the memory buffer of memory buffer unit 14 for temporary storage and then transferred as a serial data stream to an external receiver such as the RAM of another unprogrammed stored program industrial controller. The contents of the multi-PROM circuit board 11 is thereby copied into the RAM memory of such controller.

The memory buffer unit 14 also includes an error checking circuit which, for example, once the PROMs of a multi-PROM circuit board are programmed checks and compares the stored data with the data in the buffer memory of the memory buffer unit 14. The error checking circuit also compares individual bits or cells of the PROMs as they are programmed and compares it with the data for the cell provided by the buffer memory to make sure that it has been correctly programmed. In some instances, more than a single high voltage shock is required to program the addressed cell as will later be described in more detail.

A further feature shown in FIG. 1 is the N signal provided by the multi-PROM circuit board and a similar signal (not shown specifically) provided by controller 13 which indicates the number of memory. Thus, an error will be indicated if, for example, there are not enough PROMs 12 on circuit board 11 to receive the entire data set generated by source 13 to memory buffer unit 14, and conversely, if stored program industrial controller 13 does not contain enough memory to receive all of the information stored in the PROMs of a circuit board 11 where the data from the circuit board 11 is to be transferred through memory buffer unit 14 to the memory of controller 13.

In the case of the circuit board, the N signal is provided, for example, by selectively hard wiring one or more conductors to a ground or Vcc bus to provide a binary signal indicative of the number of chips mounted on the circuit board 11.

Each of the above subsystems 14-17 comprising PROM programmer 10 will next be described in detail.

Figure 2:
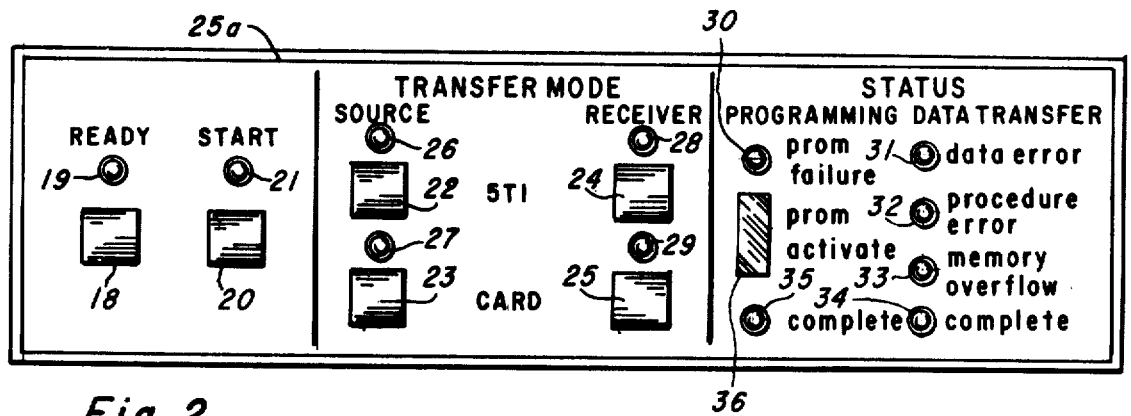
FIG. 2 is a front elevational view of the control panel of the PROM programmer.

Referring to FIG. 2, PROM Programmer 10 includes a control panel 25a having a plurality of control switches and a plurality of indicator lights. Activation of ready switch 18 generates a reset condition. When the logic of PROM Programmer 10 has been appropriately reset, ready light 19 is lit to indicate such ready condition. Then, when the operator is ready for data to be transferred, start switch 20 is activated to generate a begin transfer condition. PROM Programmer 10 responds by lighting start indicator light 21 and actual data transfer begins.

A group of switches 22–25, control the data transfer mode of PROM Programmer 10. That is, a selection is made by the operator utilizing these switches to indicate whether data is to be transferred from the external source (5TI) to the PROMS on the circuit board (CARD) or vice versa. Thus, switch 22 is activated to indicate that the 5TI is the data source and switch 25 is activated to indicate PROM circuit board 11 is the receiver; and alternately control switch 23 is activated to indicate that PROM circuit board 11 is the data source and the data it contains is transferred to the memory of the external receiver (5TI) when control switch 24 is activated. Indicator lights 26–29 respond to indicate the selected data source and data receiver for the particular data transfer.

A plurality of status lights 30–36, are provided on control panel 25a to indicate the status of PROM Programmer 10 during its operation and particularly the existence of any error conditions. Indicator lights 30, 35 and 37 indicate particular conditions which occur during the programming mode while indicator lights 31–34 indicate particular conditions which occur during the data transfer mode.

Each of the conditions indicated by the control panel indicator lights are provided by signals from control unit 15 which will be discussed in detail later. The control switches provide signals to control unit 15 which alters the operation of the PROM Programmer accordingly.

Figure 3:
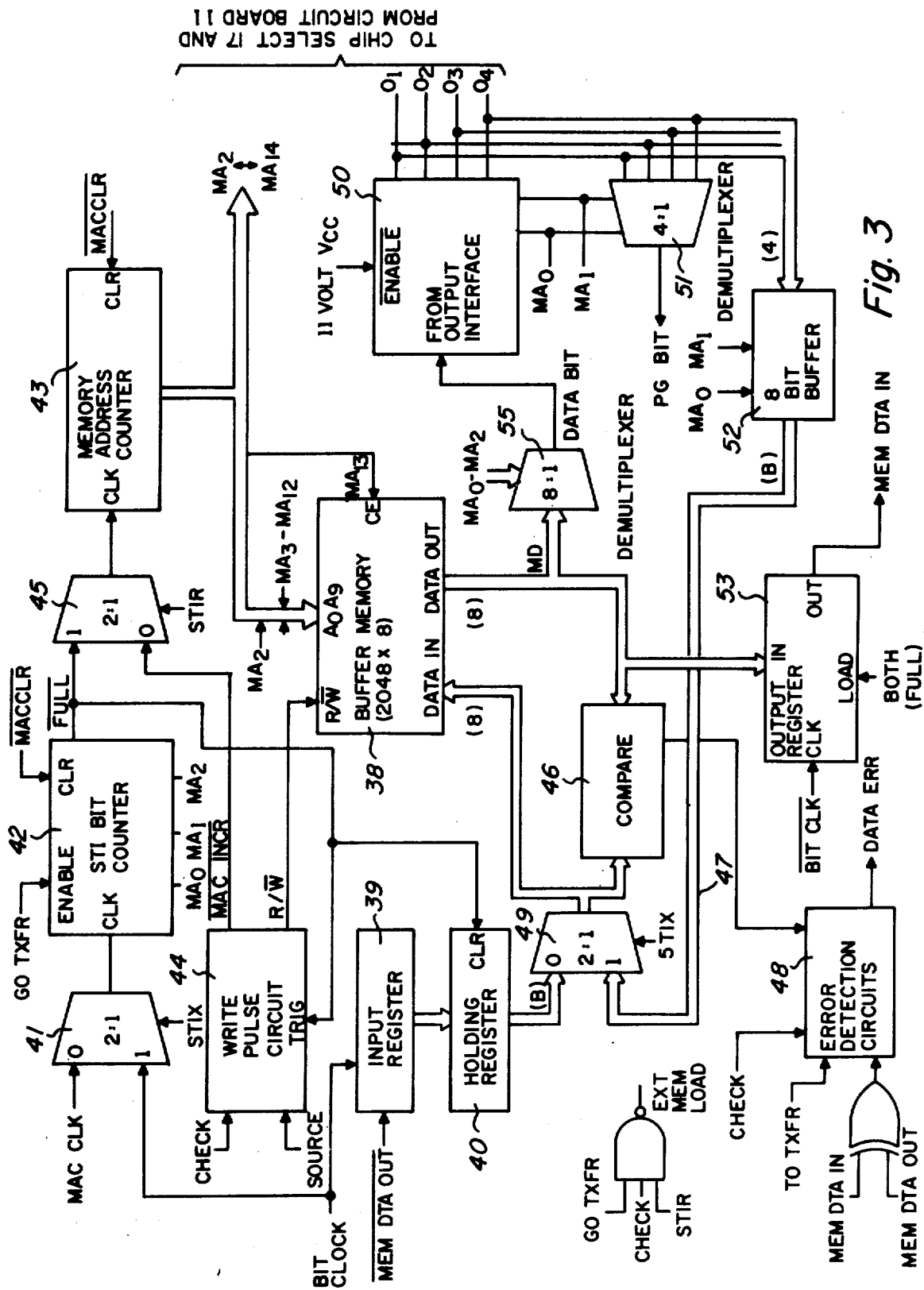
FIG. 3 is a logic diagram of the memory buffer unit.

Referring now to FIG. 3, memory buffer unit 14 is next described in detail.

Memory buffer unit 14 is comprised of a buffer memory 38, which is this embodiment, is organized as a 2,048 word by 8 bit/word array to interface with 16 bit words as two 8 bit half words received from the 5TI or other external data source over $\overline{\text{MEM DTA OUT}}$ via input register 39 and with two 4 bit PROM words per 8 bit 5TI half word.

The 16 bit words received at input register 39 are in the form of a continuous serial data stream; first bit, first word, second bit, first word, through the 16th bit of the first word, then second word, first bit, etc. The entire memory of the sending source, (i.e., 5TI controller 13) cycles through, for example, in about 8.5 milliseconds. Holding register 40 is provided for intermediate temporary storage of the 8 bit half words. Thus, 8 bits are serially received by input register 39 and transferred in parallel to holding register 40. The 8 bit half word stored in holding register 40 is then transferred into an 8 bit word of buffer memory 38 while the next 8 bit half word is being serially received by input register 39. This process continues until all of the source data words have been stored in buffer memory 38.

$\overline{\text{BIT CLOCK}}$ is a one clock pulse per bit signal generated by the external data source, controller 13, and is utilized to synchronize the data transfer from the external source to the PROM Programmer. $\overline{\text{BIT CLOCK}}$ is applied both to input register 39, and, through selector gate 41, to bit counter 42 when the 5TIX signal indicates that the 5TI is transmitting and the external clocking signal is present. Alternately, selector gate 41 selects memory address counter internal clocking signal $\overline{\text{MACCLK}}$ when the 5TIX signal indicates that the external bit clock signal is not present. The internal clocking signal $\overline{\text{MACCLK}}$ is generated by control unit 15, and is available for example, in the transfer of data from the buffer memory 38 to PROM circuit board 11 and in the transfer of data from PROM circuit board 11 to buffer memory 38, where the external data source/receiver is not involved.

Counter 42, which controls the loading of holding register 40, is merely a 3 bit binary counter which counts to 8. Counter 42, thereby generates the 3 low order address bits, $MA_0MA_2$, and a carry bit (CT8) each 8th count to provide a $\overline{\text{FULL}}$ signal.

The $\overline{\text{FULL}}$ signal is applied to the clock (CLK) input of holding register 40 in order to clock in the 8 bit half word from input register 39 and to write pulse circuit 44. Write pulse circuit 44, which is essentially comprised of a NAND logic gate, receives a CHECK signal and a SOURCE signal from control circuit 15 and selectively provides the write indication signal to the R/W terminal of buffer memory 38, to store the contents in holding register 40 into the addressed location of buffer memory 38. Write pulse circuit 44 receives the $\overline{\text{FULL}}$ signal and generates therefrom a delayed memory address counter increment signal $\overline{\text{MACINCR}}$ selected by a selector gate 45, to increment address counter 43, thereby providing the next address to buffer memory 38 after the data has been written, in preparation for the next holding register contents to be stored. Address counter 43 provides 12 address bits $MA_3$–$MA_{14}$; address bits $MA_3$–$MA_{12}$ are provided to address input terminals $A_0$–$A_9$ of buffer memory 38 to address the buffer memory.

After all of the data received through input register 39 has been stored in buffer memory 38, control unit 15 provides a checking procesure in which the same data stream is again received through input register 39. This time, as the 8 bit half words are temporarily stored in holding register 40, they are compared in comparator 46 to the data stored at the addressed location in buffer memory 38, to determine whether the data stored in the buffer memory the first time is correct. If the 8 bits stored in holding register 40 are identical to the 8 bits at the data output (DATA OUT) of buffer memory 38, a favorable compare signal is provided over line 47 to error detection circuits 48. Error detection circuits 48 will later be described in detail with respect to FIG. 7. When an error is detected, error circuits 48 will cause the PROM Programmer to go into a failure mode and the error will be indicated on control panel 25. In the checking mode, bit counter 42 is incremented in the same manner as described for the initial storing of data in buffer memory 38, and address counter 43 is incremented directly by the $\overline{\text{FULL}}$ signal. Since the system is in the checking mode, as indicated by the $\overline{\text{CHECK}}$ signal, a read indication signal will be provided to the R/W input of buffer memory 38, by write pulse circuit 44 to read rather than write memory contents.

As previously mentioned, PROM Programmer 10 is also capable of transmitting data to an external receiver such as the 5TI industial controller 13. This may be done, for example, to duplicate a program stored in the memory of one controller in the memory of a second controller or to duplicate the program permanently stored on a PROM card in the memory of a controller. Whether the data source for this transfer to the external receiver originated in a controller or in the PROM circuit board, it passes to buffer memory 38. The transferring of data from a first controller to buffer memory 38 has already been described above. The transferring of data from PROM circuit board 11 to buffer memory will later be described. Thus, assume for the moment that a set of data is stored in buffer memory 38 which is to be transferred serially to an external 5TI industrial controller 13. The $\overline{\text{BIT CLOCK}}$ signal is received from the industrial controller 13 and is selected via selector gate 41 to increment bit counter 42. The $\overline{\text{FULL}}$ signal generated by bit counter 42 is selected via selector gate 45 to increment memory address counter 43 as the 5TIR signal indicates that the 5TI is the receiver. Since the 5TI is not the data source write pulse circuit 44 provides a read indication signal to terminal R/W of buffer memory 38 and the address data is provided at the DATA OUT bus of buffer memory 38. The 8 bit half word is loaded into output register 53 in parallel on a $\overline{\text{FULL}}$ signal from bit counter 42, and serially transferred out as $\overline{\text{MEM DTA IN}}$ to the external 5TI controller 13. Output register 53 is clocked by $\overline{\text{BIT CLK}}$ which is a direct function of the BIT CLOCK signal provided by the 5TI controller 13.

The last function of buffer memory unit 14 is to transfer data back and forth between buffer memory 38 and PROMS 12 mounted on circuit board 11. The particular PROMS utilized in the present embodiment are 4 bit PROMS such as the SN74S287N or SN74S387N manufactured and sold as standard products by Texas Instruments, Incorporated, the assignee of the present invention. The 4 bit data words are provided to the PROMS via bus $\theta_1$–$\theta_4$. In order to write data into the PROM, each bit must be separately addressed. This is accomplished by multiplexing the 8 bit data word read from the output of buffer memory 38 by the multiplexer 55. Demultiplexer 55 receives the low order address bits $3MA_0$–$MA_2$ provided by bit counter 42 to select one at a time in sequence, a bit of data from the DATA OUT bus of buffer memory 38 and transfer such data bits to PROM output interface 50. PROM output interface 50 then transmits the data bit to a selected one of the bit lines $\theta_1$–$\theta_4$ depending upon the two lowest order address bits $MA_0$ and $MA_1$. Thus, the first data bit from multiplexer 55 appears on the $\theta_1$ line, the second data bit appears on the $\theta_2$ line and the third on the $\theta_3$ line and the fourth on the $\theta_4$ line, to be written into the cells of a 4 bit word addressed by the $MA_2$–$MA_{14}$ address bits generated by bit counter 42 and memory address counter 43. Then, the fifth data bit from multiplexer 55 is transmitted to the $\theta_1$ line, the sixth data bit to the $\theta_2$ line, the sixth to the $\theta_3$ line and the seventh to the $\theta_4$ line to be stored in the cells of another four bit PROM word addressed according to the address bits $MA_2$–$MA_{14}$. As discussed previously, with respect to FIG. 1, the highest order of these bits $MA_{10}$–$MA_{13}$ are routed to chip select circuitry 17 to select the appropriate PROM chip and the $MA_2$–$MA_9$ address bits addressed the particular 4 bit word of the selected PROM chip to be programmed. A more detailed explanation of the programming procedure will be provided later in the discussion of FIGS. 5 and 6. It should be noted that PROMS 12 already contain a stored state and only some of the cells will have to be addressed to alter that state in order to store the desired data. Thus, interface 50 will only be enabled by an 11 $\overline{\text{VOLT Vcc}}$ programming signal.

As each bit of the PROM is addressed to be programmed it is desirable to be able to read the single bit to determine its state before programming and after programming, because it may not initially contain the state it is supposed to and because it may not get programmed even though programming has taken place. For this purpose, a demultiplexer 51 is provided, which, when the PROM is addressed in a read mode, transmits the 4 bits of the addressed data word over lines $\theta_1$–$\theta_4$ which bits are received by demultiplexer 15 and a single one of these bits is selected according to the two lowest order address bits $MA_0$ and $MA_1$ which is output as the PG BIT. The PG BIT may then be tested to determine the state of the addressed bit.

It should again be noted here that in the transmitting of data between buffer memory 38 and PROM 12 of circuit board 11 the clocking signal $\overline{\text{MACCLK}}$ is selected by selector 41 since an external industrial controller 13 is not involved in these particular operations, and the external $\overline{\text{BIT CLOCK}}$ signal is not available. Otherwise, the bit counter and memory address counter operate in the same manner as described above. Each two 4 bit words stored in the PROM 12 circuit board 11 comprise an 8 bit half word stored in buffer memory 38 or holding register 40 as discussed above. Thus, in order to read the data out of PROM circuit board 11, an 8 bit buffer memory 52 is provided which is addressed by the two lowest order memory address bits $MA_0$ and $MA_1$ in order to store the first 4 bit PROM word in the first 4 bits of buffer 52 and the second 4 bit PROM word in the second 4 bits of buffer 52. The 8 bit word stored in buffer 52 is then available to selector 49. In a checking mode, for instance, after the entire PROM circuit board 11 has been programmed, the stored contents of PROM circuit board 11 may be compared to the data stored in buffer memory 38 which was utilized to program PROM circuit board 11. The 8 bit data words are read out of PROMs 12 and out of buffer memory 38 according to the memory address $MA_0$–$MA_{14}$, and compared in comparator 46. In the 8 bits provided at the DATA OUT bus of buffer memory 38 are identical to the 8 bits at the output of buffer 52, comparator 46 will indicate a favorable comparison over line 47 to error detection circuits 48. The 8 bit words stored in buffer 52 are also provided by selector 49 to the DATA IN bus of buffer memory 38. Thus, in another mode, with a SOURCE control signal provided to write pulse circuit 44, a write enable signal is provided to the R/$\overline{W}$ terminal of buffer memory 38 and the contents of PROM circuit board 11 provided in buffer 50 are stored in buffer memory 38. After the entire contents of the PROM circuit board 11 have been copied into the buffer memory 38, the contents of the PROM circuit board 11 may be compared with the contents of buffer memory 38 which now contains the data transferred from PROM circuit board 11 in a similar manner to that just described, in a checking mode. The contents of buffer memory 38 may then be transmitted to a 5TI industrial controller 13 via output register 53 as a serially data stream $\overline{\text{MEM DTA IN}}$.

Figure 4:
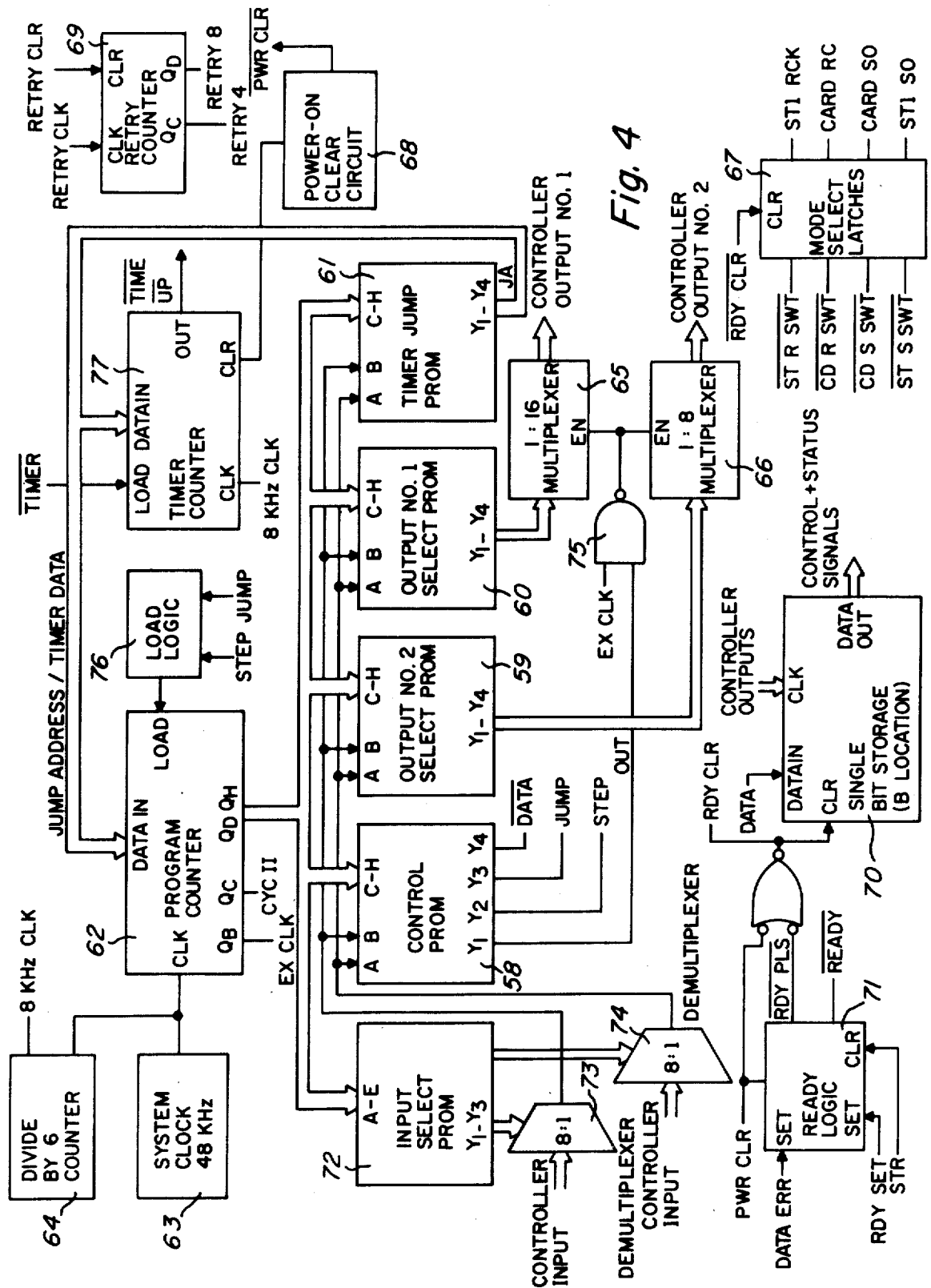
FIG. 4 is a logic diagram of the control unit.

Referring to FIG. 4, control unit 15 will next be described in detail. As previously stated, control unit 15 controls all of the operations of PROM programmer 10. It controls the transfer of data into and out of the external 5TI industrial controller 13 and into and out of PROM circuit board 11, provides for error checking, interfaces with the mode select and other control switches on control panel 25 and provides signals to the indicator lights of control panel 25.

Control unit 15 is essentially comprised of five read only memories 58–61 and 72 which may consist of programmed ROMs or PROMs. A program counter 62, clocked by system clock 63 (at, for example, 48 KHZ), provides a sequential program count which simultaneously addresses all of the memories 58–61 and 72. This program count may be altered by the output of timer/jump PROM 61 which contains a plurality of "jump to" address (as will as a plurality of timer values). The "jump to" addresses are loaded into program counter 62 when a JUMP command signal is provided to load logic 76 by control PROM 58.

Thus, the program counter may jump to an address indicated by timer/jump PROM 61 or step in sequence; the particular action taken being controlled by control PROM 58.

The present address of each of the PROMs 58–61 is provided by two control bits A and B in addition to the 6 bits C-H provided by program counter 62. Input select PROM 72, which also receives the program counter value, selects via multiplexers 73 and 74, up to 2 of the 16 logic inputs which may be tested. The two selected logic inputs provide the A and B address bits for addressing PROMs 58–61. These logic (CONTROLLER) inputs include the $\overline{\text{CHECK}}$ signal, the RUN signal, the PG bit, the signals from the switches of the control panel, as latched into mode select latches 67, etc.

Output select PROMs 59 and 60 provide up to two simultaneous output logic signals via multiplexers 65 and 66 to control the operation of the PROM programmer when indicated to do so by control PROM 58, which provides an OUT signal to NAND gate 75. NAND gate 75 also receives a clocking signal, $\overline{\text{EXCLK}}$ from the QB output of program counter 62, thereby providing enable pulse synchronized with the $\overline{\text{EXCLK}}$ signal. Selected ones of the output logic (CONTROLLER) signals may be latched into D type flip flips comprising the 13 single bit storage locations of storage means 70 in order to maintain the particular logic condition. The single bit storage locations are cleared by ready logic 71. Power on clear circuit 68 coupled to ready logic 71 automatically clears single bit storage means 70 when the system is initially powered up.

In order to allow the PROM programmer to perform certain read time operations such as applying an eleven volt programming signal to a PROM cell for a certain amount of time, timer counter 77 may be set up to count down that certain amount of time. In order to initialize timer counter 77, the timer value stored in PROM 61 at a particular address is loaded into timer counter 77 by a $\overline{\text{TIMER}}$ signal. Timer counter 77 is then decremented by the lower frequency clocking signals (8 KHz) provided by system clock 63 through divide by 6 counter 64 until timer counter value reaches 0 in which case a $\overline{\text{TIME UP}}$ signal is generated at the output of timer counter 77. Power on clear circuit 68 automatically clears the counter 77 when the system is initially powered up.

The contents of the read only memories 58–61 which control a PROM programmer in a particular desired manner are shown in Tables I–IV. These will best be understood when the operation of the PROM programmer is described in detail with respect to FIGS. 8A–H.

In order to better understand the operation of the control unit hardware, a simple example is given here. Assume that program counter 62 is presently at 000100 and regardless of the state of address bits A and B, control PROM 58 indicates a STEP at that state. At the next pulse from system clock 63 then, program counter 62 will step to count 000101. If the 000100 count is also an output state, then at that address of control PROM 58 an OUT will also be stored and logic output signals will be stored at that address in output PROMs 59 and 60. The particular output logic signal may depend upon one or two controller inputs, in which case the address 000100 to input select PROM would provide an indication of which controller inputs are of significance. The selected logic inputs would then provide the A and B bits of the addresses to PROMs 59 and 60, which in turn would provide the appropriate logic output signals. These outputs appear only for a single pulse of system clock 63 and as discussed above, it may be desirable on the next clock pulse to store them in a single bit of storage means 70. This will be accomplished if for program count 000101 the corresponding address of control PROM 58 a $\overline{\text{DATA}}$ state was stored. The program counter continues stepping as indicated by control PROM 58 until it is desired to jump in which case control PROM 58 will contain a JUMP state and the contents of the jump PROM 61 at that address will be loaded into program counter 62.

Mode select latches 67 provide storage for the mode control switches on control panel 25 where the switches are momentarily contact push buttons. Further, a retry counter 69 is provided in control unit 15 to keep track of the number of trails in programming a PROM cell. Counter 69 will be discussed in detail later with respect to the programming procedure.

As previously discussed, PROMs 12 mounted on circuit board 11 are addressed by means of address bit $MA_2$ generated by bit counter 42 and address bits $MA_3-MA_{13}$ generated by memory address counter 43. The bits are individually selected for programming by means of PROM output interface 50 and individually selected for reading by means of demultiplexer 51; both being coupled to the data bus $\theta_1-\theta_4$. PROM output interface 50 and demultiplexer 51 are controlled by address bits $MA_0$ and $MA_1$ generated by bit counter 42.

It has also been previously discussed that the addressed cell of a selected PROM is written into by the application of an 11 volt power signal to the chip $V_{cc}$ terminal. A 5 volt power signal to the same $V_{cc}$ terminal provides for the addressed cell to be read. PROM output interface 50 will supply a logic signal to data lines $\theta_1-\theta_4$ only when enabled by an 11 $\overline{\text{VOLT } V_{cc}}$ logic signal from control unit 15 as previously discussed. This $\overline{\text{11 VOLT } V_{cc}}$ logic signal is also coupled to controlled dual $V_{cc}$ voltage supply 16 to indicate to voltage supply 16 whether to apply the high 11 volt programmed or the low 5 volt power signal to the $V_{cc}$ terminal of the selected PROM cell.

Figure 6:
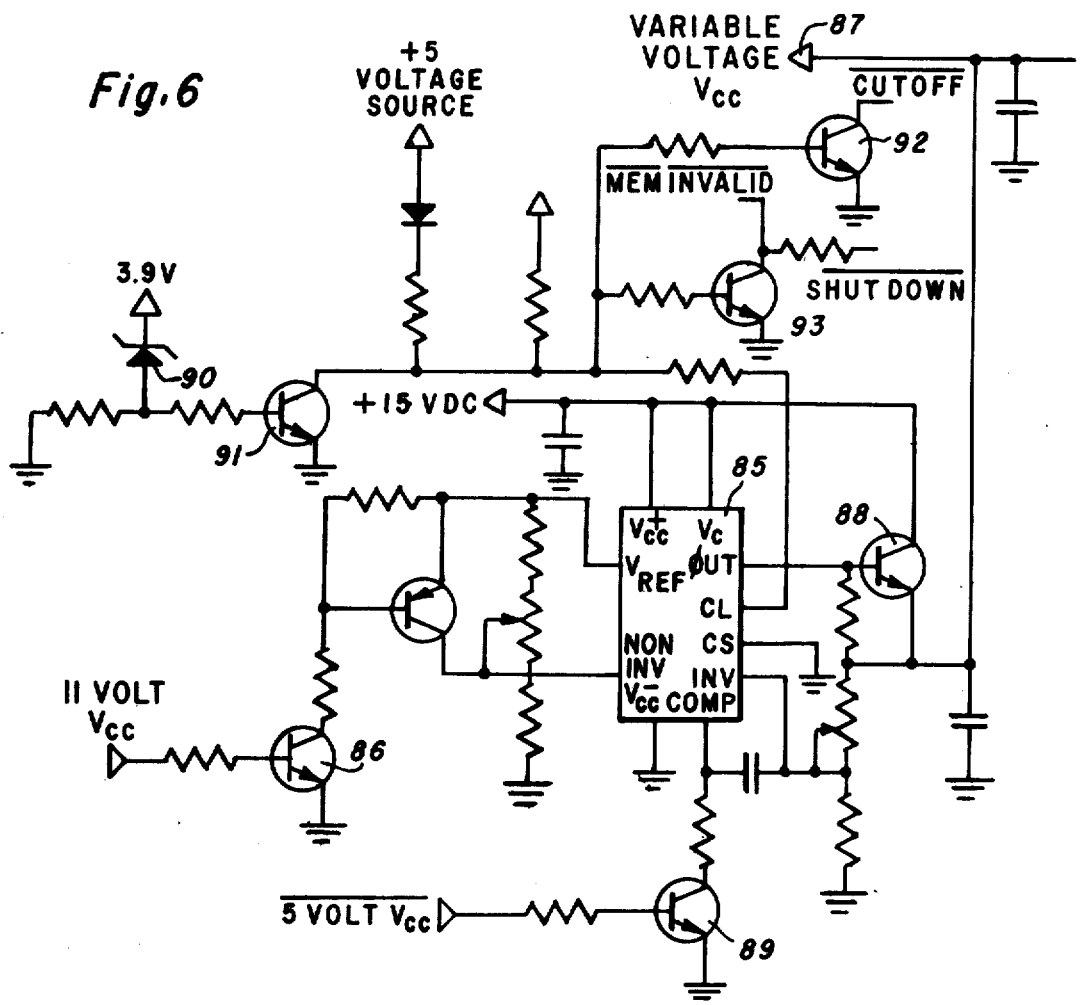
FIG. 6 is a circuit diagram of the controlled dual Vcc supply.

Controlled dual $V_{cc}$ voltage supply 16 is shown in detail in FIG. 6. Essentially, it is comprised of a voltage regulator 85 such as a standard SN72723 manufactured and sold by Texas Instruments Incorporated, the assignee of the present invention, as a standard product. An $\overline{\text{11 VOLT } V_{cc}}$ logic signal supplied by control unit 15 to transistor 86 causes an 11 volt power signal to be provided at output terminal 87 by means of transistor 88 and a $\overline{\text{5 VOLT } V_{cc}}$ logic signal supplied by control unit 15 to transistor 89 causes a 5 volt power signal to be provided at output terminal 87 by means of transistor 88. In case of a variance in the voltage, Zener diode 90 detects this condition and produces an error signal to the base of transistor 91, which causes transistors 92 and 93 to generate the failure signals $\overline{\text{CUTOFF}}$, $\overline{\text{MEM INVALID}}$ and $\overline{\text{SHUT DOWN}}$. The output of transistor 91 also causes voltage regulator 85 to clear.

Figure 5:
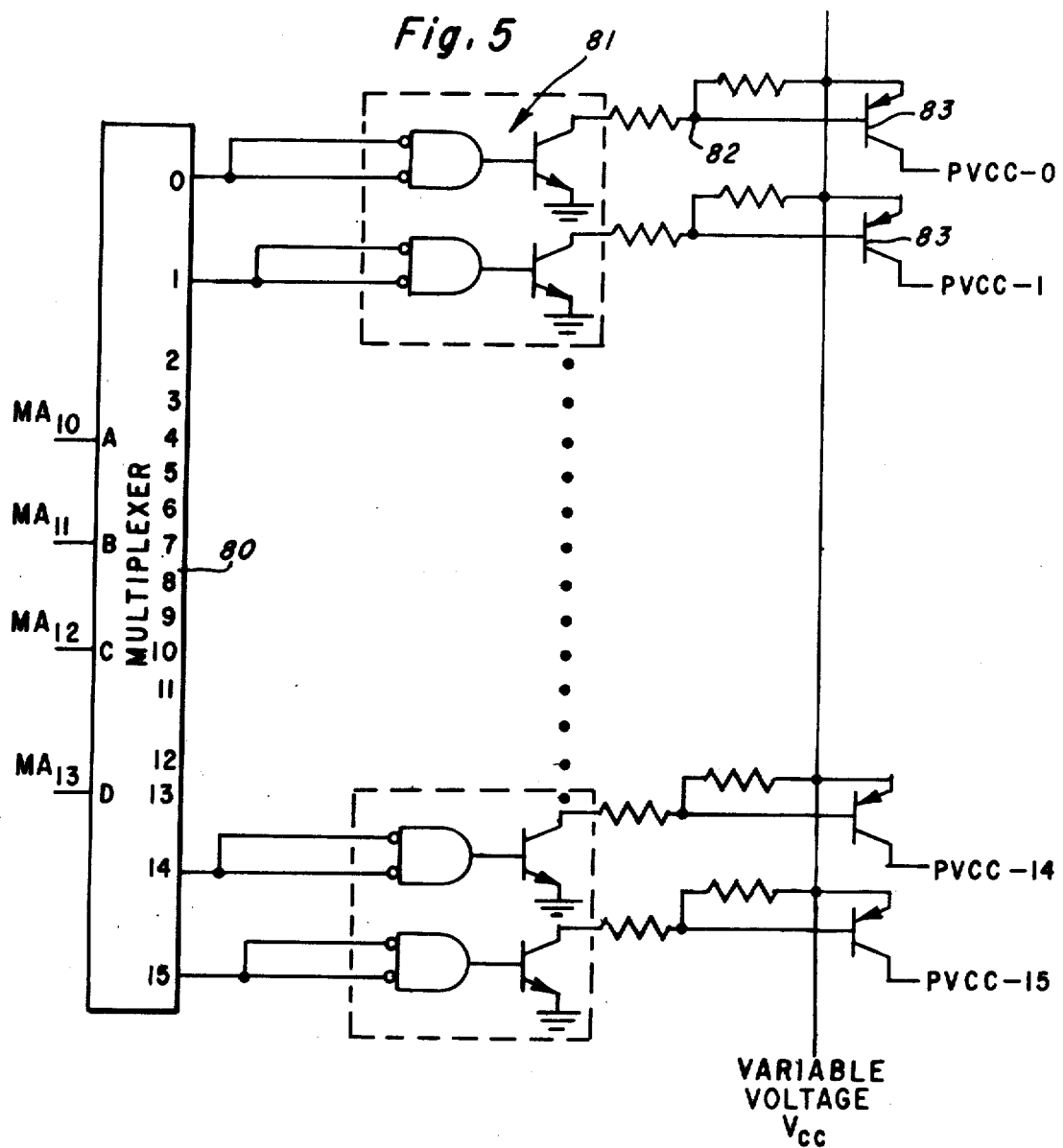
FIG. 5 is a logic diagram of the chip select circuitry.

Referring to FIG. 5, chip select $V_{cc}$ circuitry 17 is shown in detail. Chip select $V_{cc}$ circuitry 17 is comprised of a multiplexer 80 which receives address bits $MA_{10}-MA_{13}$ and selects one of 16 lines 0–15. The 16 output lines of multiplexer 80 are respectively coupled to 16 drive circuits 81 which are provided by, for example, standard Q2T3244 integrated circuit drivers. The outputs of the driver circuits 81 are respectively connected to the bases 82 of 16 output transistors 83. The emitters of transistors 83 are coupled in common to the variable $V_{cc}$ power signal supplied by controlled dual $V_{cc}$ supply 16 so that the selected output voltage, 11 or 5 volts, is supplied by one of the collector terminals PVCC-0 - PVCC-15 to one of 16 PROMs mounted on circuit board 11, depending upon the address bits $MA_{10}-MA_{13}$ supplied to multiplexer 80. In this manner, PROM chip is selectively enabled with a selected voltage level to selectively read or write into an addressed cell of the selected PROM chip.

The remainder of the address $MA_2-MA_9$, generated by bit counter 42 and memory address counter 43 are transmitted in common directly to the address bits of the PROMs to address the selected PROM while the $MA_0$ and $MA_1$ address bits provided by bit counter 42 address the appropriate data bus line $\theta_1-\theta_4$ as previously discussed.

Figure 7:
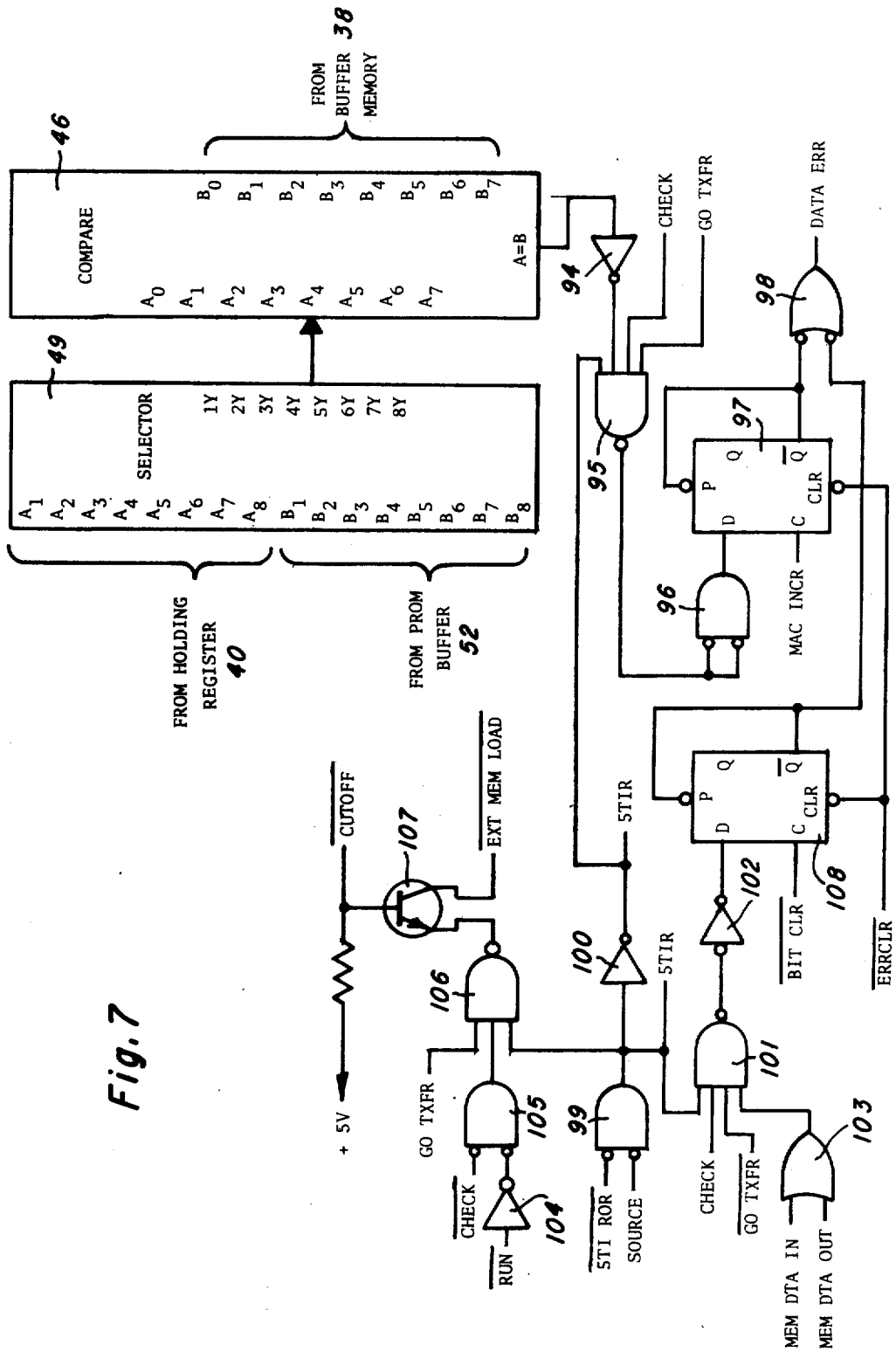
FIG. 7 is a logic diagram of the error circuit.

Error detection circuit 48 of memory buffer unit 14 has already been discussed. These circuits are shown in further detail in FIG. 7. Referring then to FIG. 7, selector 49 is shown coupled to comparator 46. The 8 bits from holding register 40 or the 8 bits from PROM buffer 52 are provided at the 8 bit output of selector 49, depending on which of these is selected. The selected 8 bits (which are also provided to the DATA IN terminals of buffer memory 38) are applied to the A ($A_0-A_7$) inputs of comparator 46. The 8 bits from buffer memory 38 DATA OUT are applied to the B ($B_0-B_7$) inputs of comparator 46. If A=B, no error has occurred. However, if A≠B, logic gates 94–96 will latch an error condition into D type flip flop 97 and provide a data error signal at the output of OR gate 98. Combinations of other conditions indicating a system failure are applied to logic gates 99–103 are latched into D type flip flop 108, also indicating a data error condition at the output of OR gate 98. Logic gates 99 and 104–107 providing logic gate 54 in FIG. 3 generate an $\overline{\text{EXT MEM LOAD}}$ condition signal. The operation of PROM programmer 10 will best be understood with reference to the flow charts of FIGS. 8a–8h when they are put together as indicated in the map of FIG. 8.

POWER ON

Figure 8A:
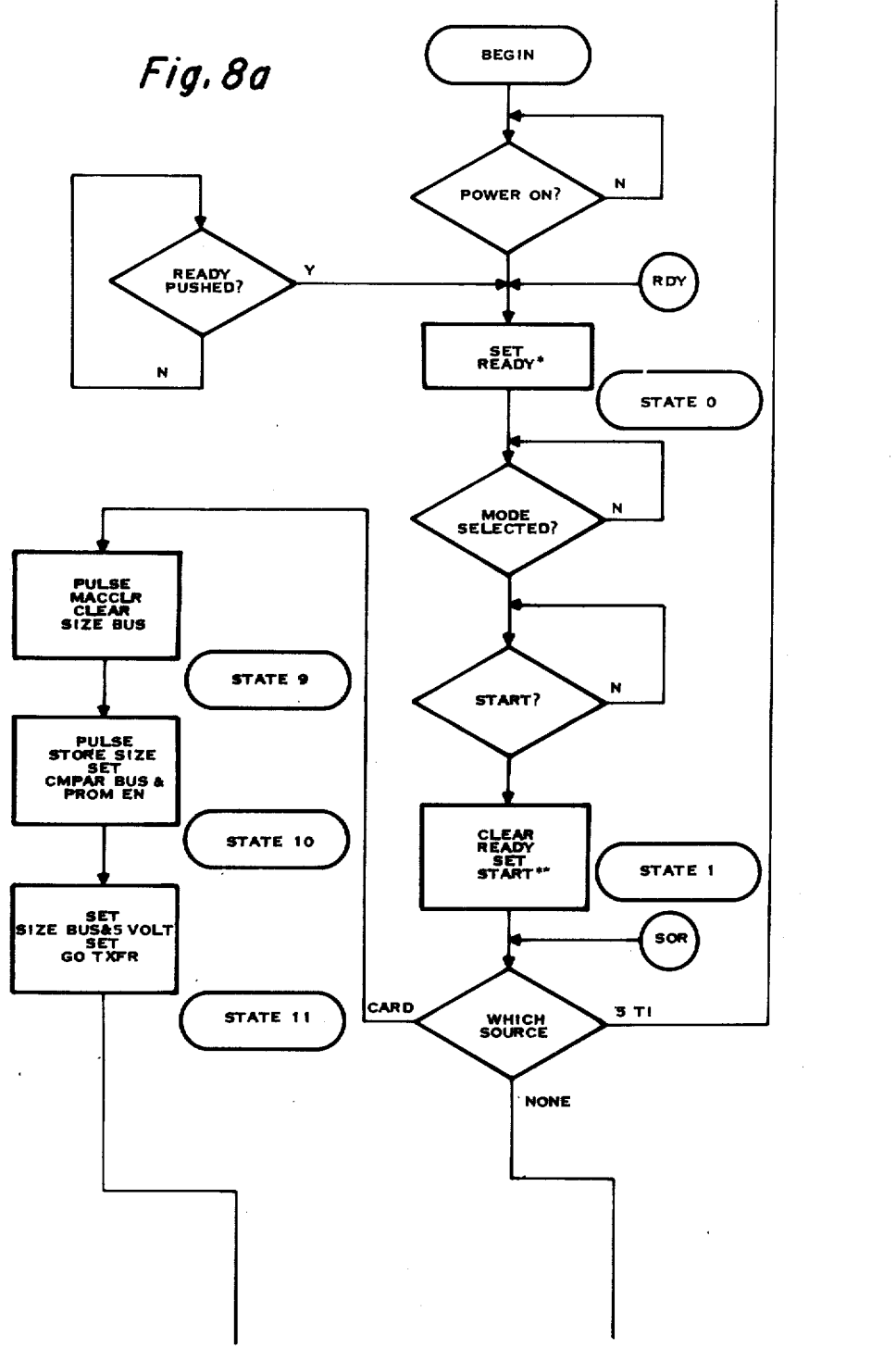
FIGS. 8a-h are flow charts showing in detail the sequence of operations of the PROM programmer under control of the control unit.
Figure 8B:
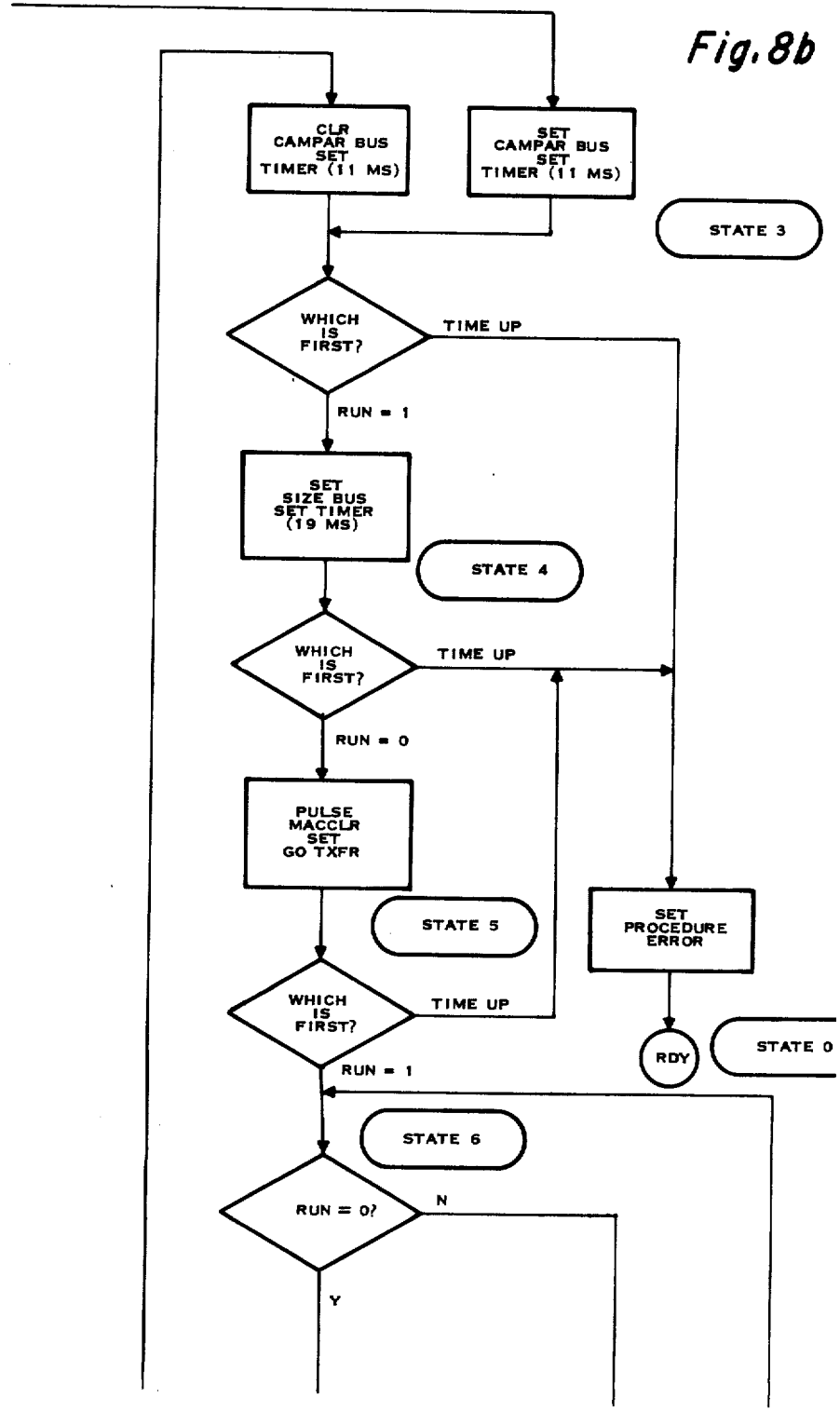
Figure 8C:
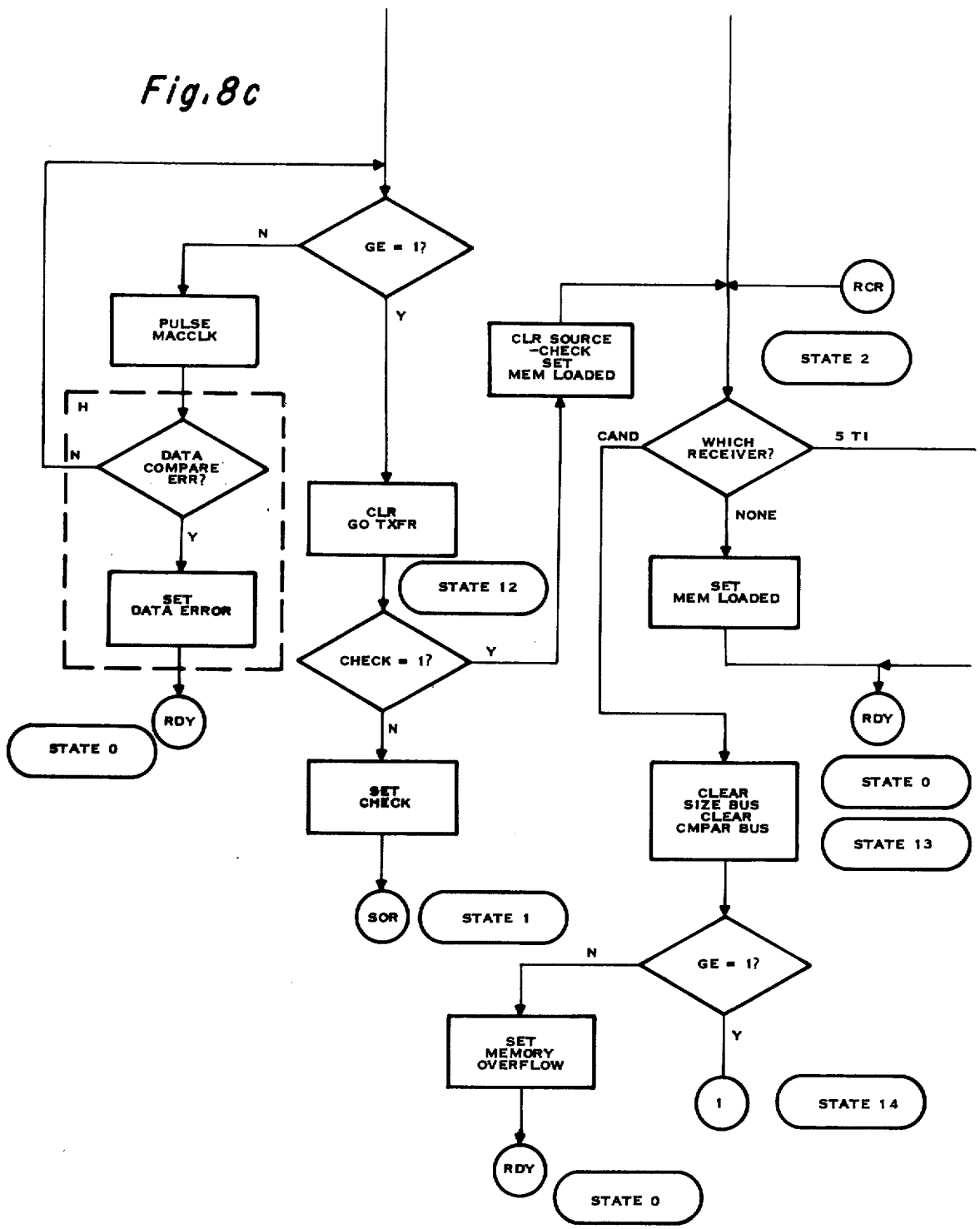
Figure 8D:
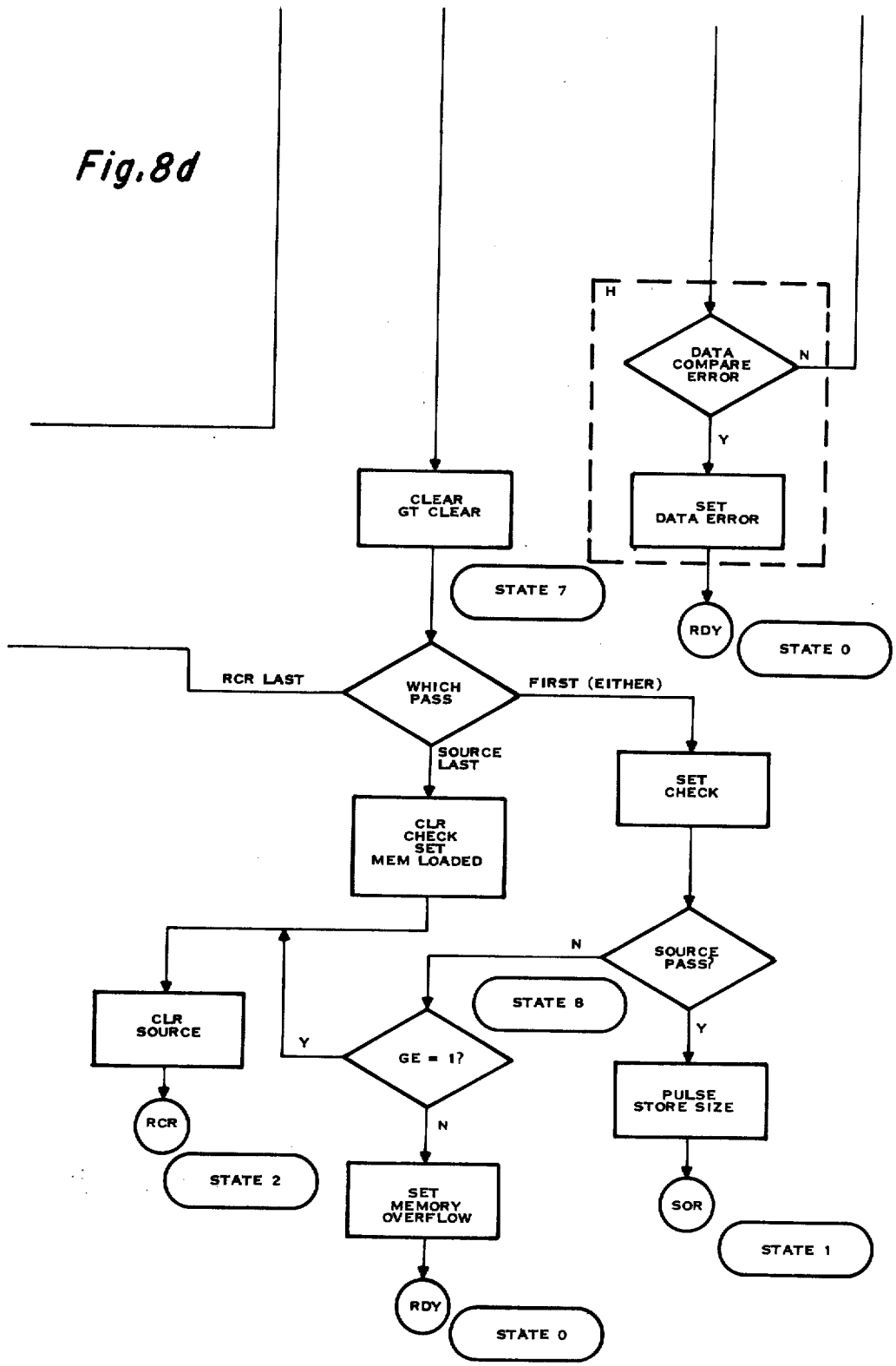

Referring then to FIG. 8a, a power on condition causes control unit 15, and in particular power on clear circuit 68, to set the system to a predetermined initial state automatically. In the process, a ready condition is set and when READY switch 18 of control panel 25a is activated, ready light 19 is turned on.

STATE 0

At this point, the operating procedure for the operator of the PROM programmer is to select a mode by means of control switches 22-25. One of the four modes: 5TI source, 5TI receiver, PROM card source or PROM card receiver, or a combination of two of these may be selected. There are four distinct paths in the flow chart that control unit takes in carrying out the operations associated with each of these modes. Further, the PROM programmer may be controlled to take a combination of these paths. If a combination of paths is selected, control unit 15 causes one procedure to be performed and then the other, automatically, without stopping in between. First, let's consider the mode in which the 5TI industrial controller 13 is the data source. In this mode, data is copied from the 5TI industrial controller and stored in buffer memory 38. This mode is selected by activating mode select switch 22, which condition is latched into the latches 67 and light 26 is activated. Now, since the mode has been selected, START control switch 20 is activated to proceed to control state 1.

STATE 1

The ready load condition is cleared and the start condition is set; indicator light 21 lights up to indicate this condition. Next, the source selected 5TI or PROM card is checked. Since in this example, we are assuming that the 5TI has been selected as the source, jump PROM 61 causes a "jump to " control state 3 of FIG. 8B.

STATE 3

Selector 49 sets the compare bus so that the date from holding register 40 is provided to the DATA In terminal of buffer memory 38. Timer counter 77 is set to a predetermined value (11 milliseconds) and the system waits for a RUN=1 condition. If the RUN signal, sent by the 5TI industrial controller 13 indicating a data transfer is not equal to 1 before the 11 milliseconds is up, a procedure error condition is set causing lamp 32 of control panel 25a to light up and a return to control state 0 at the next pulse of system clock 63. The 11 milliseconds is selected in this instance since it takes approximately 8 milliseconds for the 5 TI controller 13 to dump its entire memory contents and recycle ready to dump it again. We will assume that an error condition did not occur and the 5 TI industrial 13 generated a RUN=1 signal before the time period lapsed.

STATE 4

Now, the data will be transferred, supposedly in 8 milliseconds. Timer counter 77 is again set, this time to a second predetermined value (19 milliseconds) to determine whether the 5TI industrial controller will reset the run signal to RUN=0 after the data has been transferred. If it does reset the run signal within the second time period alotted, it is assumed that the data is being transferred properly and the system will proceed to control state 5; otherwise, if the timer runs out, the PROCEDURE ERROR condition will be set and program counter 62 returned to control state 0. The machine address counter clearing signal $\overline{\text{MAC CLR}}$ is pulsed to reset bit counter 42 and memory address counter 43 to memory address 0. A GO TRANSFER condition is set and program counter 62 proceeds to state 5. Now, when the run signal goes positive RUN=1 the actual data transfer begins.

STATE 6

The data is transferred and stored in buffer memory 38 until the run signal RUN=0. When that occurs, the data bus between the 5TI industrial controller and input register is cleared.

STATE 7

At this point, the number of passes is checked to determine whether it is a receiver last pass, source last pass, first pass of either. This is because PROM programmer 10 operates in two modes for each transfer; a first actual data transfer mode and a second data checking mode; these modes have previously been discussed with reference to the hardware. Let us assume that this is the first pass. The path indicated is taken and CHECK condition is set so that on the next pass control unit, 15 will be in the checking mode. If the 5TI industrial controller was the data cource, such as in the present instance, we proceed to state 8; then we pulse store source, that is, store the memory address reached by the memory address counter and return to state 1. The system then goes through the entire process again as described above. This time, however, a data compare is performed is comparator 46 (indicated as hardware "H" in the flow diagram) by comparing the data input through input register 39 to holding register 40 to the data stored during the first pass in the buffer memory 38. If the data does not compare, an error exists and the DATA ERROR condition is set in storage 70 and program counter 62 returns to state 0 with the error condition indicated by light 31. Then the system again proceeds to state 7 and the pass again determined by looking at the state of the CHECK condition. Since CHECK was set during the first pass, it is now determined that this is the last pass and since it is the source, the CHECK condition is cleared, memory loaded condition is set causing indicator lamp 34 to light, the SOURCE condition is cleared, and program counter 62 jumps to control state 2.

STATE 2

Here, it is determined whether the data stored in buffer memory 38 is to be transferred to a 5TI industrial controller receiver or a PROM circuit board (CARD). If no receiver is indicated, program counter 62 returns to state 0 (ready condition) waiting for a receiver mode to be selected by the operator; perhaps, the operator will be required to remove a first industrial controller and substitute a second controller before the PROM programmer continues with the data transfer.

If the receiver is a 5TI industrial controller, the compare bus is cleared, timer counter 77 is set to the first predetermined value (11 milliseconds) and control unit 15 recycles the PROM programmer through control states 4-7 again. This time, the data stored in buffer memory 38 is transferred on a RUN=1 condition to the 5TI industrial controller (receiver). Since it is the first data transfer in this direction, at control state 7, is set and program counter 77 is stepped to state 8.

STATE 8

Here, the GE bit is tested. The GE bit is the result of a comparison between the size of the memory contained within the 5TI (or as will later be seen) a PROM circuit board and the number of words contained in buffer memory 38 as determined in state 7 when the highest address of memory address counter 43 is stored. If the GE bit equal one, then the 5TI memory is large enough to contain the entire data set stored in buffer memory 38 and the transfer can take place. Otherwise, the MEMORY OVERFLOW condition is set, causing the operator's failure light 33 on control panel 25a to be lit and program counter 62 to jump to state 0. Assuming the GE bit equal one and the transfer of data has taken place properly, the SOURCE condition is cleared and program counter 62 is jumped to state 2 so that the received data can be checked. Since the receiver in this example is a 5TI industrial controller, control unit 15 proceeds through control states 4–7, this time in a checking mode utilizing compare circuitry 46 to compare the contents of holding register 40 and the contents of buffer memory 38. It should be noted here that the 5TI is sending the received data back to the PROM programmer in this mode and the procedure is identical to the first checking mode where the 5TI was the data source as discussed above.

At state 7, since this is the last pass (checking mode) where the 5TI is the receiver, the MEMORY LOADED condition is set and indicator light 34 is lit to indicate to the operator that the data has been successfully transferred. The system then returns to control state 0.

Returning to control state 1, let us again assume that the buffer memory 38 has been filled with data from a 5TI industrial controller source and we wish to transfer this data permanently to a PROM circuit board 11 by selecting the CARD (via operator control switch 25) to be the receiver.

At control state 2, it is determined that the PROM circuit board 11 (CARD) is the receiver and the size bus and compare bus conditions are cleared. The GE bit is checked (as discussed with respect to control state 8) to determine whether there are enough PROMs 12 on circuit board 11 as determined by comparing the N input from circuit board 11 (see FIG. 1) and the contents of the size memory set from the contents of memory address counter 43 during control state 7 when buffer memory 38 was loaded. If there are insufficient PROMs GE=1 the MEMORY OVERFLOW condition is set and indicator lamp 33 is lit to advise the operator. Program counter 62 would then jump to state 0.

Figure 8E:
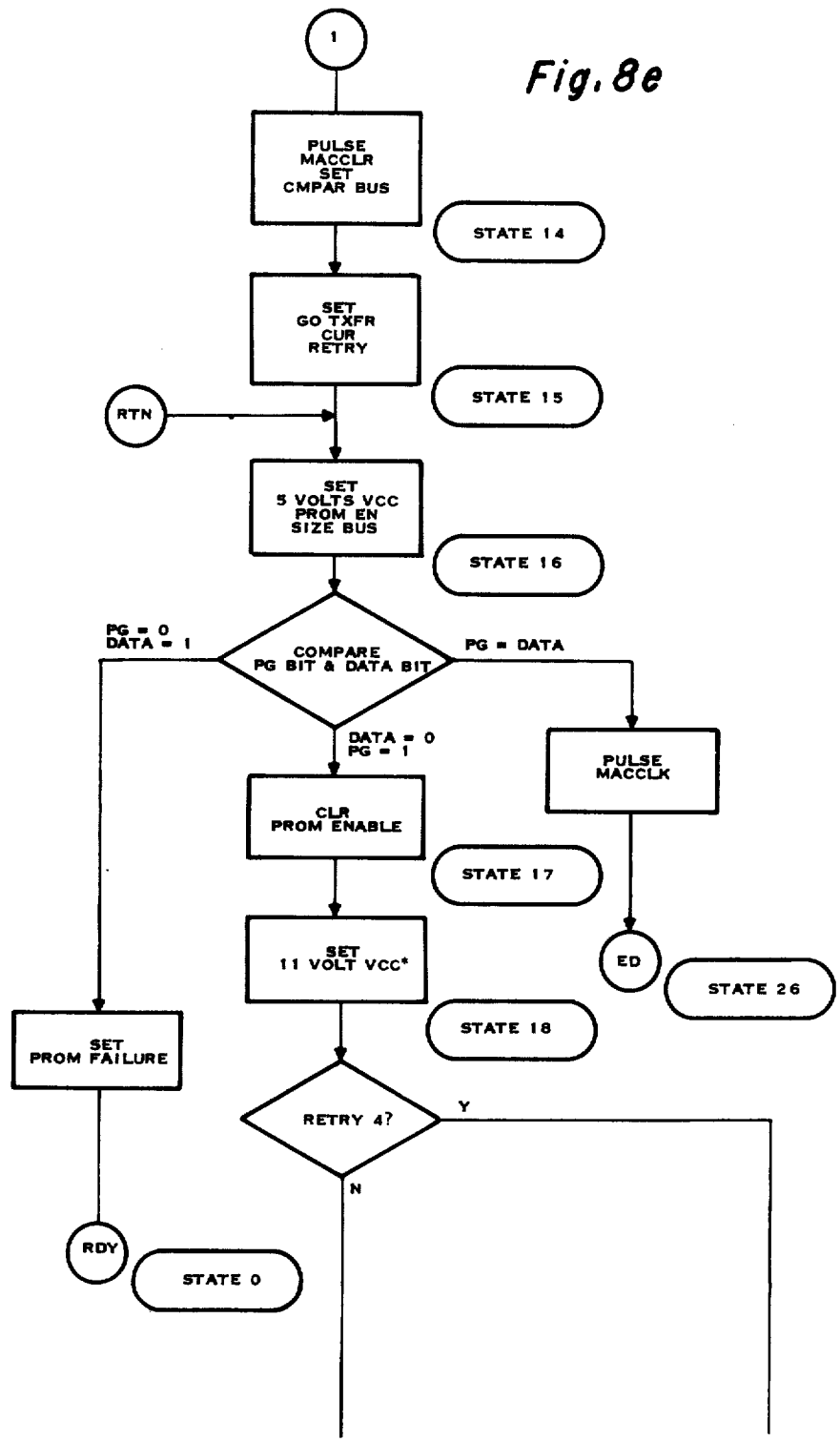
Figure 8F:
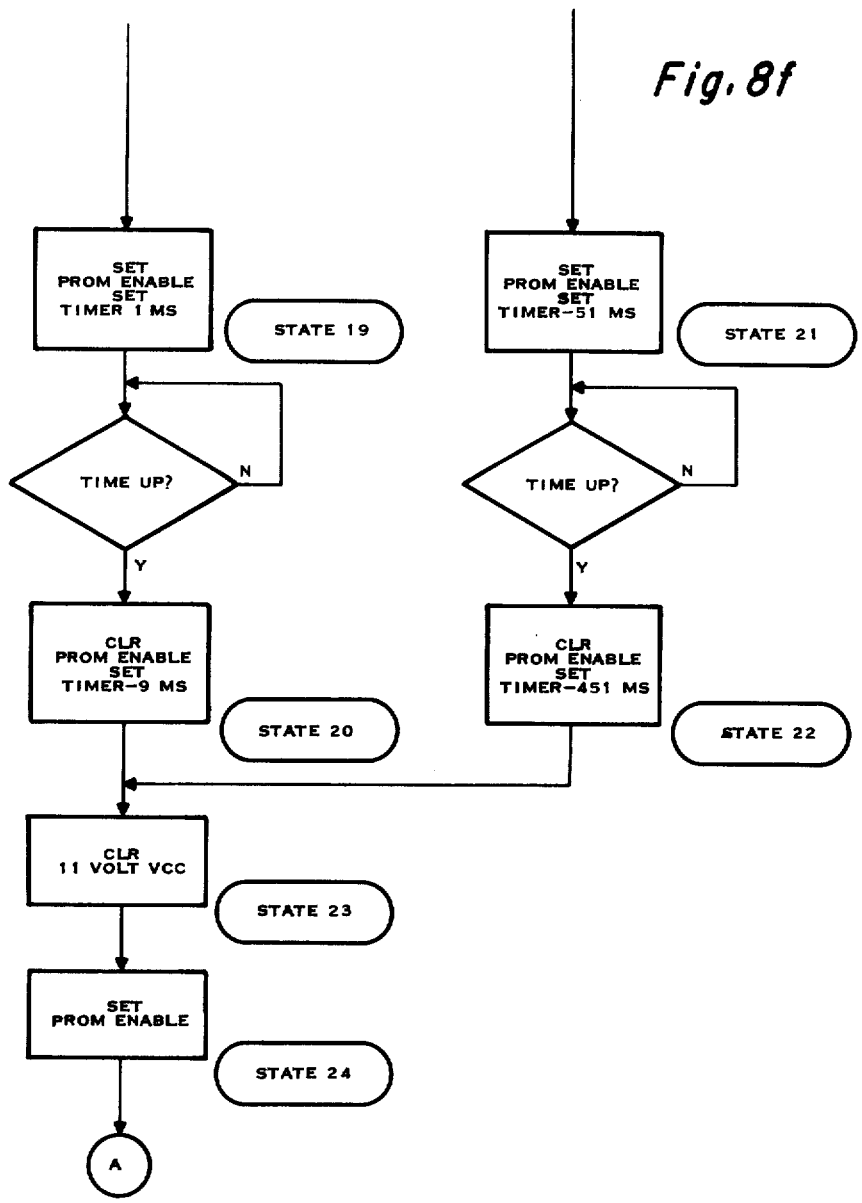

Assuming that there is sufficient PROM memory capacity on circuit board 11, the system proceeds to state 14 as shown in FIG. 8e.

STATE 14

The memory address counter is cleared by pulsing MAC CLR and the compare bus is set by means of selector 49 to that an 8 bit word from buffer 52 may be provided to comparator 46.

STATE 15

A go transfer condition is set and retry counter 69 is set to indicate a first try.

STATE 16

Controlled dual $V_{cc}$ supply 16 is set to provide a 5 volt $V_{cc}$ voltage level for reading and a selected cell is read from the addressed PROM by means of demultiplexer 51 producing the PG bit. If the PG bit is equal to the DATA bit which is to be stored in the addressed cell, $\overline{MAC\ CLK}$ is pulsed to increment bit counter 42 and memory address counter 43 to the next address. The PROM programmer then proceeds to state 26 in FIG. 8g.

STATE 26

The 5 volt $V_{cc}$ condition is cleared and the PROM disabled. Timer counter 77 is checked and since it had not been previously set the time is automatically lapsed and control unit 15 steps to control state 27.

STATE 27

Here, the GE bit is tested to determine whether the last cell to be programmed has been reached. If the last cell has not been reached, program counter 62 is returned to control state 15 and the PROM programmer proceeds with the next bit. This time, when control state 16 is reached, assume that the PG bit equals zero and the data bit equals one. Also assume in this example that the PROM which is to be programmed is initially contains all ones and that programming a cell with a high voltage causes the cell to be altered to zero. Therefore, if the data to be stored in a particular cell must be equal to one but the PG bit already equals zero (caused for example by heat produced in the programming of an adjacent cell) then a failure condition exists. Accordingly, the PROM FAILURE condition is set providing an indication to the operator by means of light 30 of control panel 25a and program counter 62 jumps to control state 0.

Now assume a third condition, in which the data bit equal zero and PG bit equal one. This is a normal condition where programming is required since all of the cells initially contain a one and the appreciation of a high voltage should program the cell to zero. Program counter 62 then steps to control state 17.

STATE 17

The PROM enable condition is cleared and control dual $V_{cc}$ supply 16 is set to produce an 11 volt $V_{cc}$ to the addressed PROM cell. We will assume that this is the first try (set during state 15 in retry counter 69), four counts maximum being allowed. Since it is not the fourth count, program counter 62 proceeds to control state 19 illustrated in FIG. 8f.

STATE 19

The PROM enable condition is now set and time counter 77 set for one millisecond. The 11 volt $V_{cc}$ power signal is then applied for one second while the $\overline{TIME\ UP}$ condition is being checked. When timer counter 77 has reached the one millisecond count, the TIME UP signal will be generated causing program counter 62 to be stepped to control state 20 on the next clock pulse.

STATE 20

The PROM enable condition is cleared, timer counter 77 is set for a 9 millisecond cool off period so the PROM will not read false data and program counter 62 jumps to control state 23.

STATE 23

The $\overline{11\ volt\ V_{cc}}$ signal to controlled dual $V_{cc}$ supply 16 is cleared.

STATE 24

Figure 8G:
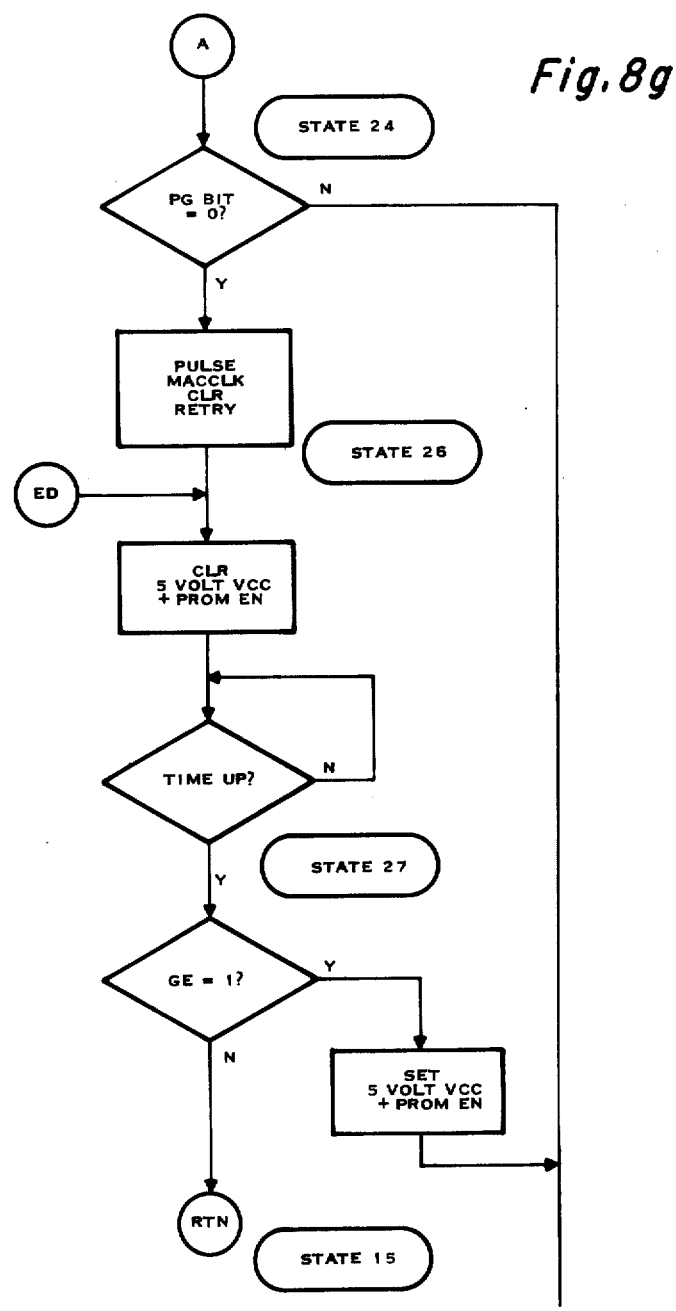
Figure 8H:
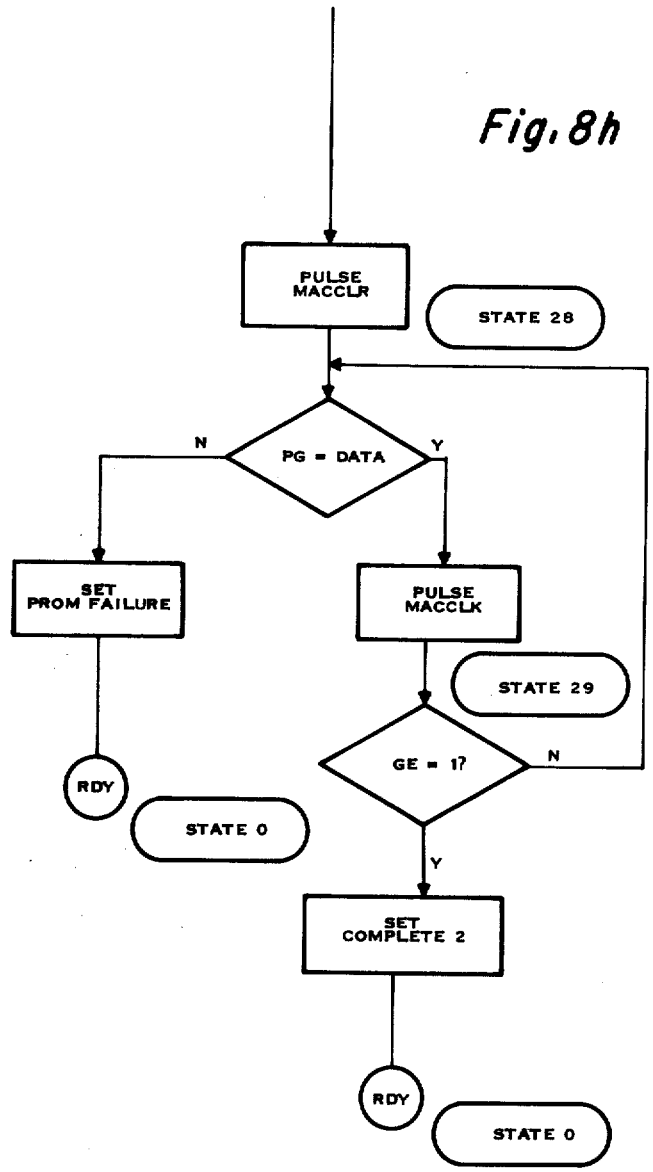

The PROM enable condition is set and as shown in FIG. 8g the PG bit tested to see it if is equal to zero. If PG equal zero program counter 62 proceeds to control state 26 and through control state 27 to determine whether that was the last bit. If it was not the last bit, as determined by GE=1, program counter 62 jumps to state 15 for the next bit.

Assume that during state 24 the PG bit is found not to equal zero. Program counter 62 jump to control state 28 illustrated in FIG. 8h.

STATE 28

$\overline{\text{MAC CLR}}$ is pulsed causing bit counter 42 and memory address counter 43 to be reset to zero. The DATA bits and PG bits are then read and compared bit for bit. So long as the bits are found to be equal $\overline{\text{MAC CLK}}$ is pulsed to address another bit. If they are not equal, the PROM FAILURE condition is set providing an indication to the operator by means of PROM FAILURE light 30 on control panel 25a. Program counter 62 then returns to state zero.

The completed programming will be indicated to the operator by means of indicator light 35 on control panel 25a.

If a cell does not program the first time, the operator may wish to try again. The procedure is the same proceeding through control state 18. At control state 18, the retry counter will be tested and if it is the 4th retry, program counter 62 will proceed to control state 21 instead of control state 19.

STATE 21

PROM enable is set and timer counter 77 is set for a 51 millisecond delay rather than the normal one millisecond delay, since the one millisecond delay has, by this point, already been tried three times.

STATE 22

PROM enable is cleared and timer counter 77 is set for a 451 millisecond cooling off period.

Program counter 62 then steps to state 23 and on through state 24 to determine if the addressed cell has been successfully programmed to a zero.

Returning now to state 24, let us assume that the PC bit has been programmed to equal 0 and the previously programmed data was still in tact. Program counter 62 now proceeds to state 26.

STATE 26

$\overline{\text{MAC CLK}}$ is pulsed to advance bit counter 42 and memory address counter 43 to the next bit. Retry is cleared since we are now proceeding to a new bit. The 5 volt $V_{cc}$ is cleared and the PROM enable condition is set. Timer counter 77 is checked for a time up signal indicating that the 9 millisecond cooling off period (or 451 millisecond cooling off period in the case of a 4th retry) is up.

STATE 27

When the cooling off period has ended the GE bit is tested to determine whether there are further bits requiring programming. If there are further bits requiring programming, program counter 62 jumps to control state 15 in order to proceed with the next bit. If all of the bits have been programmed, the 5 volt $V_{cc}$ condition is set and the PROM enable condition is set.

STATE 28

Program counter 62 steps to state 28 where the contents of the programmed cells, PG bits, are individually compared to the bits contained in buffer memory 38 in a checking mode. Here, the bits are individually tested.

At state 29, if it is determined that the last cell has been tested, the COMPLETE condition is set and indicated to the operator and program counter 62 returns to control state 0. If an error is detected before the last cell has been reached, the PROM FAILURE condition is set as previously discussed, which is indicated to the operator and program counter 62 then returns to control state 0.

Returning to control state 1, assume that PROM circuit board 11 is the data source containing data which is to be trasferred to buffer memory 38 and then perhaps to a 5TI industrial controller 13 as the receiver. The transfer procedure of the buffer memory 38 to the 5TI receiver has already been discussed. The initial transferring of data from the PROM program card 11 to buffer memory 38 mode will therefore now be discussed. At state 1, the data source is circuit board 11 (CARD) so program counter 62 jumps to control state 9

STATE 9

$\overline{\text{MAC CLR}}$ is pulsed setting bit counter 42 and memory address counter 43 to address zero. The SIZE bus is cleared.

If the memory address counter 43 is incremented to the last stored data bit as indicated by GE=1, the GO TRANSFER condition is cleared, and program counter 62 proceeds to state 12.

At state 12, the CHECK condition is tested to determine whether the PROM programmer is in a checking mode. Since it is in the checking mode as indicated by CHECK being equal to one, SOURCE is cleared, CHECK is reset to the not equal one condition and the MEM LOADED condition is set as indicated by lighting indicator lamp 34.

Data stored in the PROMs of a multi-PROM circuit board 11 have now been duplicated in buffer memory 38 and the contents of buffer memory 38 checked against the contents of the PROM memories to assure the integrity of the data stored in buffer memory 38.

Program counter 62 then jumps to state 2 to determine what to do with the stored data. The 5TI and PROM card as data receivers has already been discussed in detail. If no receiver has been selected, the MEM LOADED condition is set (again in this case) and program counter 62 returns to control state 0.

As previously discussed with respect to FIG. 4, the above described procedure takes place automatically by control unit 15 with the coding shown in Tables I–IV stored in the read only memories 58–61, respectively. Although the control unit 15 has been described with reference to the specific circuit embodied in FIG. 4, it is contemplated that control unit 15 may be provided by a microprocessor having or coupled to a read only memory means containing a similar set of coding specifically oriented to the particular microprocessor selected.

STATE 10

The N bit is tested to determine the number of PROMs on circuit board 11. The size is stored, and the compare bus 49 is set so that the output of 8 bit buffer 52 is transferred by means of selector 49 to the DATA IN terminals of buffer memory 38. The PROM enable condition is set and program counter 62 steps to state 11.

STATE 11

The SIZE bus is set, controlled dual $V_{cc}$ supply 16 is set at 5 volts and a GO TRANSFER condition is set. The data transfer then takes place until GE=1 indicating that the entire PROM circuit board contents has been stored in buffer memory 38 and GO TRANSFER is cleared.

STATE 12

At this point, the CHECK condition is tested to determine whether the previous pass was a data storage pass or a data checking pass. If CHECK=1, it is determined that the previous pass was a data storage pass and CHECK is set, indicating a checking mode. Program Counter 62 then jumps to state 1 and on through states 9, 10 and 11. This time as bit counter 42 and address counter 43 are incremented by $\overline{\text{MAC CLK}}$, the data in buffer 62 is compared with the data just stored in the corresponding word of buffer memory 38 in comparator 46. If the data words at any address do not compare, the DATA ERROR condition is set and indicator light 31 of control panel 25a is lit to indicate the data error. Program counter 62 then jumps to state 0.

TABLE I

| HEX ADDRESS | ADDRESS CODE INPUTS ||| STATE |||||  CONTROL ROM OUTPUTS ||||| COMMENTS |
|---|---|---|---|---|---|---|---|---|---|---|---|---|---|
| | INA A | INB B | CYC C | D | E | F | G | H | OUT Y1 | STEP Y2 | JMP Y3 | DATA Y4 | |
| 0 & 4 | 0 | 0 | 0/1 | 0 | 0 | 0 | 0 | 0 | 0 | 0 | 0 | X | Start, but no mode: step, out |
| 1 & 5 | 1 | 0 | 0/1 | 0 | 0 | 0 | 0 | 0 | 0 | 0 | 0 | X | Start, mode: Step, out |
| 2 & 6 | 0 | 1 | 0/1 | 0 | 0 | 0 | 0 | 0 | 1 | 1 | 0 | 0 | Start & mode step to 1 |
| 3 & 7 | 1 | 1 | 0/1 | 0 | 0 | 0 | 0 | 0 | 0 | 0 | 0 | X | Start & mode: Step & out |
| 8 & C | 0 | 0 | 0/1 | 1 | 0 | 0 | 0 | 0 | 0 | 1 | 0 | X | No sor, step to 2 |
| 9 & D | 1 | 0 | 0/1 | 1 | 0 | 0 | 0 | 0 | 1 | X | 1 | 0 | 5TI Sor, Jump to 3 |
| A & E | 0 | 1 | 0/1 | 1 | 0 | 0 | 0 | 0 | 1 | X | 1 | 1 | Card sor, Jump to 9 |
| B & F | 1 | 1 | 0/1 | 1 | 0 | 0 | 0 | 0 | X | X | X | X | Don't care |
| 10 & 14 | 0 | 0 | 0/1 | 0 | 1 | 0 | 0 | 0 | 1 | X | 1 | 0 | No RCR, Jump to 0 |
| 11 & 15 | 1 | 0 | 0/1 | 0 | 1 | 0 | 0 | 0 | 1 | 1 | 0 | 1 | 5TI RCR, Step to 3 |
| 12 & 16 | 0 | 1 | 0/1 | 0 | 1 | 0 | 0 | 0 | 1 | X | 1 | 1 | Card RCR, Jump to 13 |
| 13 & 17 | 1 | 1 | 0/1 | 0 | 1 | 0 | 0 | 0 | X | X | X | X | Don't care |
| 18, 1C | 0 | 0 | 0/1 | 1 | 1 | 0 | 0 | 0 | 1 | X | 1 | 0 | Time up, Jump to O, Proceed |
| 19, 1D | 1 | 0 | 0/1 | 1 | 1 | 0 | 0 | 0 | 0 | 0 | 0 | X | No action, No Step |
| 1A, 1E | 0 | 1 | 0/1 | 1 | 1 | 0 | 0 | 0 | 1 | 1 | 0 | 0 | Run = 1, Step, Size Bus, Timer |
| 1B, 1F | 1 | 1 | 0/1 | 1 | 1 | 0 | 0 | 0 | 1 | 1 | 0 | 0 | Run = 1, Step, Size Bus, Timer |
| 20 & 24 | 0 | 0 | 0/1 | 0 | 0 | 0 | 0 | 0 | 1 | 1 | 0 | 0 | Run = 0; Step to 5 |
| 21 & 25 | 1 | 0 | 0/1 | 0 | 0 | 1 | 0 | 0 | 1 | 1 | 0 | 0 | Run = 0; Step to 5 |
| 22 & 26 | 0 | 1 | 0/1 | 0 | 0 | 1 | 0 | 0 | 1 | X | 1 | 0 | Time up; Jump to 0 |
| 23 & 27 | 1 | 1 | 0/1 | 0 | 0 | 1 | 0 | 0 | 0 | 0 | 0 | X | No time up or run = 0 |
| 28 & 2C | 0 | 0 | 0/1 | 1 | 0 | 1 | 0 | 0 | 1 | X | 1 | 0 | Time up; Jump to 0 |
| 29 & 2D | 1 | 0 | 0/1 | 1 | 0 | 1 | 0 | 0 | 0 | 0 | 0 | X | No time up or run = 1 |
| 2A & 2E | 0 | 1 | 0/1 | 1 | 0 | 1 | 0 | 0 | 0 | 1 | 0 | X | Run = 1 step to 6 |
| 2B & 2F | 1 | 1 | 0/1 | 1 | 0 | 1 | 0 | 0 | 0 | 1 | 0 | X | Run = 1 step to 6 |
| 30 & 34 | 0 | 0 | 0/1 | 0 | 1 | 1 | 0 | 0 | 1 | 1 | 0 | 1 | Run = 0, step to 7 |
| 31 & 35 | 1 | 0 | 0/1 | 0 | 1 | 1 | 0 | 0 | 1 | 1 | 0 | 1 | Run = 0, step to 7 |
| 32 & 36 | 0 | 1 | 0/1 | 0 | 1 | 1 | 0 | 0 | 0 | 0 | 0 | X | Run = 1; No step |
| 33 & 37 | 1 | 1 | 0/1 | 0 | 1 | 1 | 0 | 0 | 0 | 0 | 0 | X | Run = 1; No step |
| 38 & 3C | 0 | 0 | 0/1 | 1 | 1 | 1 | 0 | 0 | 1 | 1 | 0 | 0 | RCR First Pass; Step to 8 |
| 39 & 3D | 1 | 0 | 0/1 | 1 | 1 | 1 | 0 | 0 | 1 | 1 | 0 | 0 | SOR First Pass; Step to 8 |
| 3A & 3E | 0 | 1 | 0/1 | 1 | 1 | 1 | 0 | 0 | 1 | X | 1 | 0 | RCR Last Pass; Jump to 0 |
| 3B | 1 | 1 | 0 | 1 | 1 | 1 | 0 | 0 | 1 | X | 1 | 1 | SOR Last Pass; Jump to 2 |
| 3F | 1 | 1 | 1 | 1 | 1 | 1 | 0 | 0 | 1 | X | 1 | 0 | SOR Last Pass; Jump to 2 |
| 40 & 44 | 0 | 0 | 0/1 | 0 | 0 | 0 | 1 | 0 | 1 | X | 1 | 0 | MEM OVFLW: Jump to 0 |
| 41 & 45 | 1 | 0 | 0/1 | 0 | 0 | 0 | 1 | 0 | 1 | X | 1 | X | SOR First Pass; Jump to 1 |
| 42 & 46 | 0 | 1 | 0/1 | 0 | 0 | 0 | 1 | 0 | 1 | X | 1 | 1 | RCR First Pass; Jume to 2 |
| 43 & 47 | 1 | 1 | 0/1 | 0 | 0 | 0 | 1 | 0 | 1 | X | 1 | X | SOR First Pass; Jume to 1 |
| 48 → 4F | 0/1 | 0/1 | 0/1 | 1 | 0 | 0 | 1 | 0 | 1 | 1 | 0 | 0 | Step to 10 |
| 50 → 57 | 0/1 | 0/1 | 0/1 | 0 | 1 | 0 | 1 | 0 | 1 | 0 | 0 | 1 | Step to 11 |
| 58 & 59 | 0/1 | 0 | 0 | 1 | 1 | 0 | 1 | 0 | 1 | 0 | 0 | X | GT = 0; No Step |
| 5C & 5D | 0/1 | 0 | 1 | 1 | 1 | 0 | 1 | 0 | 0 | 0 | 0 | X | GT = 0; No Step |
| 5A & 5E | 0 | 1 | 0/1 | 1 | 1 | 0 | 1 | 0 | 1 | 1 | 0 | 1 | GT = 1; Step to 12 |
| 5B & 5F | 1 | 1 | 0/1 | 1 | 1 | 0 | 1 | 0 | 1 | 1 | 0 | 1 | GT = 1; Step to 12 |
| 60,61,64,65 | 0/1 | 0 | 0/1 | 0 | 0 | 1 | 1 | 0 | 1 | X | 1 | 0 | Check = 0; Jump to 1 |
| 62,63 | 0/1 | 1 | 0 | 0 | 0 | 1 | 1 | 0 | 1 | X | 1 | 1 | Check = 1, Jump to 2 |
| 66,67 | 0/1 | 1 | 1 | 0 | 0 | 1 | 1 | 0 | 1 | X | 1 | 0 | Jump to 2 |
| 68,69,6C,6D | 0/1 | 0 | 0/1 | 1 | 0 | 1 | 1 | 0 | 1 | X | 1 | 0 | GT = 0, Jump to 0 |
| 6A,6B,6E,6F | 0/1 | 1 | 0/1 | 1 | 0 | 1 | 1 | 0 | 1 | 1 | 0 | 0 | GT = 1, Step to 14 |
| 70 → 73 | 0/1 | 0/1 | 0 | 0 | 1 | 1 | 1 | 0 | 1 | 1 | 0 | 0 | Step to 15 |
| 74 → 77 | 0/1 | 0/1 | 1 | 0 | 1 | 1 | 1 | 0 | 1 | 1 | 0 | 0 | Step to 15 |
| 78 → 7F | 0/1 | 0/1 | 0/1 | 1 | 1 | 1 | 1 | 0 | 1 | 1 | 0 | 0 | Step to 16 |
| 80, 83 | 0/1 | 0/1 | 0 | 0 | 0 | 0 | 0 | 1 | 1 | X | 1 | 0 | PG = Data, Macclk, Go to 26 |
| 81, 85 | 1 | 0 | 0/1 | 0 | 0 | 0 | 1 | 1 | 1 | 1 | 0 | 1 | Program Bit, PROM En |
| 82, 86 | 0 | 1 | 0/1 | 0 | 0 | 0 | 1 | 1 | 1 | X | 1 | 0 | Bad Compare, PROM Fail, Go to 0 |
| 84, 87 | 0/1 | 0/1 | 1 | 0 | 0 | 0 | 1 | 1 | 0 | X | 1 | X | PG = Data, No action, Go to 26 |
| 88 → 8F | 0/1 | 0/1 | 0/1 | 1 | 0 | 0 | 1 | 1 | 1 | 1 | 0 | 0 | Step to 18 |
| 90,92,94,96 | 0 | 0/1 | 0/1 | 0 | 1 | 0 | 1 | 1 | 1 | 1 | 0 | 0 | Step to 19 |
| 91,93,95,97 | 1 | 0/1 | 0/1 | 0 | 1 | 0 | 1 | 1 | 1 | X | 1 | 0 | Retry 4 = 1, Jump to 21 |
| 98, 9A | 0 | 0/1 | 0 | 1 | 1 | 0 | 1 | 1 | 1 | 1 | 0 | 1 | Time up; Step to 20 Clr PROM En |
| 9C, 9E | 0 | 0/1 | 1 | 1 | 1 | 0 | 1 | 1 | 1 | 1 | 0 | 0 | Time up; Step to 20 Set Timer |
| 99,9B,9D,9F | 1 | 0/1 | 0/1 | 1 | 1 | 0 | 1 | 1 | 0 | 0 | 0 | X | Time Not Up; No Step |
| A0 → A7 | 0/1 | 0/1 | 0/1 | 0 | 0 | 1 | 0 | 1 | 1 | X | 1 | 1 | Jump to 23 |
| A8, AA | 0 | 0/1 | 0 | 1 | 0 | 1 | 0 | 1 | 1 | 1 | 0 | 1 | Time up; Step to 22 CLR PROM En |

TABLE I-continued

| HEX ADDRESS | ADDRESS CODE INPUTS | | | | | | | | CONTROL ROM OUTPUTS | | | | COMMENTS |
|---|---|---|---|---|---|---|---|---|---|---|---|---|---|
| | INA A | INB B | CYC C | STATE D | E | F | G | H | OUT Y1 | STEP Y2 | JMP Y3 | DATA Y4 | |
| AC, AE | 0 | 0/1 | 1 | 1 | 0 | 1 | 0 | 1 | 1 | 1 | 0 | 0 | Time up; Step to 22 Set Timer |
| A9,AB,AD-,AF,AF | 1 | 0/1 | 0/1 | 1 | 0 | 1 | 0 | 1 | 0 | 0 | 0 | X | Time Not Up, No Step |
| B0 → B7 | 0/1 | 0/1 | 0/1 | 0 | 1 | 1 | 0 | 1 | 1 | 1 | 0 | 1 | Step to 23 |
| B8 → BF | 0/1 | 0/1 | 0/1 | 1 | 1 | 1 | 0 | 1 | 1 | 1 | 0 | 0 | Step to 24 |
| C0 & C2 | 0 | 0/1 | 0 | 0 | 0 | 0 | 1 | 1 | 1 | X | 1 | 1 | PG = 0 Jump to 26 pulse Macclk |
| C1 & C3 | 1 | 0/1 | 0 | 0 | 0 | 0 | 1 | 1 | 1 | 1 | 1 | X | PG = 1 Jump to 28 Pulse MACCLR |
| C4 & C6 | 0 | 0/1 | 1 | 0 | 0 | 0 | 1 | 1 | 0 | X | 1 | 1 | PG = 0 Jump to 26 |
| C5 & C7 | 1 | 0/1 | 1 | 0 | 0 | 0 | 1 | 1 | 0 | 1 | 1 | X | PG = 1 Jump to 28 |
| C8,C9,CC,CD | 0/1 | 0 | 0/1 | 1 | 0 | 0 | 1 | 1 | 1 | 1 | 0 | 1 | Retry Not = 8, CLR 5 volts, Step |
| CA,CB,CE,CF | 0/1 | 1 | 0/1 | 1 | 0 | 0 | 1 | 1 | 1 | 1 | 1 | 1 | Retry = 8, MACCLR, Go to 28 |
| D0 → D7 | 0/1 | 0/1 | 0/1 | 0 | 1 | 0 | 1 | 1 | 1 | 1 | 0 | 1 | Step to 27 |
| D8, DC | 0 | 0 | 0/1 | 1 | 1 | 0 | 1 | 1 | 0 | 1 | 1 | 1 | GE = 0, Go to 15 |
| D9, DD | 1 | 0 | 0/1 | 1 | 1 | 0 | 1 | 1 | 0 | 0 | 0 | 1 | Time up, No Step |
| DA, DE | 0 | 1 | 0/1 | 1 | 1 | 0 | 1 | 1 | 1 | 1 | 0 | 0 | Time up, GE = 1, Step |
| DB, DF | 1 | 1 | 0/1 | 1 | 1 | 0 | 1 | 1 | 0 | 0 | 0 | 1 | Don't care |
| E0, E3 | 0/1 | 0/1 | 0 | 0 | 0 | 1 | 1 | 1 | 1 | 1 | 0 | X | Match, MACCLK, Step |
| E1,E2,E5,E6 | 1/0 | 0/1 | 0/1 | 0 | 0 | 1 | 1 | 1 | 1 | 1 | 1 | 0 | Bad CMPR, PROM Fail, Go to 0,RDYSET |
| E4, E7 | 0/1 | 0/1 | 1 | 0 | 0 | 1 | 1 | 1 | 0 | 1 | 0 | X | Match, No action, Step |
| E8,E9,EC,ED | 0/1 | 0 | 0/1 | 1 | 0 | 1 | 1 | 1 | 0 | X | 1 | X | Return, go to 28 |
| EA,EB,EE,EF | 0/1 | 1 | 0/1 | 1 | 0 | 1 | 1 | 1 | 1 | X | 1 | 0 | Complete, Go to 0 |

TABLE II

OUTPUT #1 ROM

| HEX ADDRESS | ADDRESS CODE INPUTS | | | | | | | | OUTPUTS | | | | COMMENTS |
|---|---|---|---|---|---|---|---|---|---|---|---|---|---|
| | INA A | INB B | CYC C | STATE D | E | F | G | H | OUT Y1 | STEP Y2 | JMP Y3 | DATA Y4 | |
| ,1,3,4,5,7 | 0/1 | 0/1 | 0/1 | 0 | 0 | 0 | 0 | 0 | 1 | 1 | 1 | 1 | No select (No sel) |
| 2 | 0 | 1 | 0 | 0 | 0 | 0 | 0 | 0 | 1 | 1 | 1 | 1 | No Sel |
| 6 | 0 | 1 | 1 | 0 | 0 | 0 | 0 | 0 | 0 | 0 | 0 | 0 | Select 0 - STR |
| 8,B,C,F | 0/1 | 0/1 | 0/1 | 1 | 0 | 0 | 0 | 0 | 1 | 1 | 1 | 1 | Nosel |
| 9 | 1 | 0 | 0/1 | 1 | 0 | 0 | 0 | 0 | 0 | 0 | 1 | 0 | Select 2 - CMP Bu |
| A & E | 0 | 1 | 0/1 | 1 | 0 | 0 | 0 | 0 | 1 | 1 | 1 | 1 | Nosel |
| D | 1 | 0 | 1 | 1 | 0 | 0 | 0 | 0 | 0 | 0 | 1 | 1 | Select 3 - Timer |
| 10 | 0 | 0 | 0 | 0 | 1 | 0 | 0 | 0 | 1 | 1 | 0 | 1 | Select 13 - CMPL 1 |
| 11 | 1 | 0 | 0 | 0 | 1 | 0 | 0 | 0 | 0 | 0 | 1 | 0 | Select 2 - CMP Bus |
| 12,16 | 0 | 1 | 0/1 | 0 | 1 | 0 | 0 | 0 | 0 | 0 | 1 | 0 | Select 2 - CMP Bus |
| 13,17 | 1 | 1 | 0/1 | 0 | 1 | 0 | 0 | 0 | 1 | 1 | 1 | 1 | No select |
| 14 | 0 | 0 | 1 | 0 | 1 | 0 | 0 | 0 | 0 | 0 | 0 | 1 | Select 1 - Rydset |
| 15 | 1 | 0 | 1 | 0 | 1 | 0 | 0 | 0 | 0 | 0 | 1 | 1 | Select 3 - Timer |
| 18 | 0 | 0 | 0 | 1 | 1 | 0 | 0 | 0 | 0 | 1 | 0 | 0 | select 4 - Procerr |
| 19,1D | 1 | 0 | 0/1 | 1 | 1 | 0 | 0 | 0 | 1 | 1 | 1 | 1 | No Select |
| 1A,1B,1E,1F | 0/1 | 1 | 0/1 | 1 | 1 | 0 | 0 | 0 | 0 | 0 | 1 | 1 | Select 3 - Timer |
| 1C | 0 | 0 | 1 | 1 | 1 | 0 | 0 | 0 | 0 | 0 | 0 | 1 | Select 1 - Rdyset |
| 20,21,24,25 | 0/1 | 0 | 0/1 | 0 | 0 | 1 | 0 | 0 | 0 | 1 | 0 | 1 | Select 5 - GOTXR |
| 22 | 0 | 1 | 0 | 0 | 0 | 1 | 0 | 0 | 0 | 1 | 0 | 0 | Select 4 - Procerr |
| 26 | 0 | 1 | 1 | 0 | 0 | 1 | 0 | 0 | 0 | 0 | 0 | 1 | Select 1 - RDYSET |
| 23 & 27 | 1 | 1 | 0/1 | 0 | 0 | 1 | 0 | 0 | 1 | 1 | 1 | 1 | Nosel |
| 29,2A, 2B | 0/1 | 0/1 | 0/1 | 1 | 0 | 1 | 0 | 0 | 1 | 1 | 1 | 1 | Nosel |
| 2D, 2E, 2F | 0/1 | 0/1 | 0/1 | 1 | 0 | 1 | 0 | 0 | 1 | 1 | 1 | 1 | Nosel |
| 28 | 0 | 0 | 0 | 1 | 0 | 1 | 0 | 0 | 0 | 1 | 0 | 0 | Select 4 - Procerr |
| 2C | 0/1 | 0 | 0/1 | 1 | 0 | 1 | 0 | 0 | 0 | 1 | 0 | 1 | Select 1 - RDYSET |
| 30,31,34,35 | 0/1 | 0 | 0/1 | 0 | 1 | 1 | 0 | 0 | 0 | 1 | 0 | 1 | Select 5 - GOTXR |
| 32,33,36,37 | 0/1 | 1 | 0/1 | 0 | 1 | 1 | 0 | 0 | 1 | 1 | 1 | 1 | Nosel |
| 38,39,3C,3D | 0/1 | 0 | 0/1 | 1 | 1 | 1 | 0 | 0 | 0 | 1 | 1 | 0 | Select 6 - CHK |
| 3A | 0 | 1 | 0 | 1 | 1 | 1 | 0 | 0 | 0 | 0 | 0 | 1 | Select 1 - RDYSET |
| 3E | 0 | 1 | 1 | 1 | 1 | 1 | 0 | 0 | 0 | 0 | 0 | 1 | Select 1 - RDYSET |
| 3B | 1 | 1 | 0 | 1 | 1 | 1 | 0 | 0 | 0 | 1 | 1 | 0 | Select 6 - CHK |
| 3F | 1 | 1 | 1 | 1 | 1 | 1 | 0 | 0 | 1 | 1 | 0 | 1 | Select 13 - CMPL 1 |
| 40 | 0 | 0 | 0 | 0 | 0 | 0 | 1 | 0 | 1 | 0 | 0 | 0 | Select 8 - Memove |
| 44 | 0 | 0 | 1 | 0 | 0 | 0 | 1 | 0 | 0 | 0 | 0 | 1 | Select 1 - RDYSET |
| 41,43,45,47 | 1 | 0/1 | 0/1 | 0 | 0 | 0 | 1 | 0 | 0 | 1 | 1 | 1 | Select 7 - Store Size |
| 42,46 | 0 | 1 | 0/1 | 0 | 0 | 0 | 1 | 0 | 1 | 1 | 1 | 1 | Nosel |
| 48,49,4A,4B | 0/1 | 0/1 | 0 | 1 | 0 | 0 | 1 | 0 | 0 | 1 | 1 | 1 | Select 7 - Store Size |
| 4C,4D,4E,4F | 0/1 | 0/1 | 1 | 1 | 0 | 0 | 1 | 0 | 0 | 0 | 1 | 0 | Select 2 - CMP BU |
| 50,51,52,53 | 0/1 | 0/1 | 0 | 0 | 1 | 0 | 1 | 0 | 1 | 0 | 0 | 1 | Select 9 - 5 Volt |
| 54,55,56,57 | 0/1 | 0/1 | 1 | 0 | 1 | 0 | 1 | 0 | 0 | 1 | 0 | 1 | Select 5 - GOTXR |
| 58,59,5C,5D | 0/1 | 0 | 0/1 | 1 | 1 | 0 | 1 | 0 | 1 | 1 | 1 | 1 | Nosel |
| 5A,5B,5E,5F | 0/1 | 1 | 0/1 | 1 | 1 | 0 | 1 | 0 | 0 | 1 | 0 | 1 | Select 5 - GOTXR |
| 60,61,64,65 | 0/1 | 0 | 0/1 | 0 | 0 | 1 | 1 | 0 | 0 | 1 | 1 | 0 | Select 6 - CHK |
| 62,63 | 0/1 | 1 | 0 | 0 | 0 | 1 | 1 | 0 | 0 | 1 | 1 | 0 | Select 6 - CHK |
| 66,67 | 0/1 | 1 | 1 | 0 | 0 | 1 | 1 | 0 | 1 | 1 | 0 | 1 | Select 13 - CMPL 1 |
| 68,69 | 0/1 | 0 | 0 | 1 | 0 | 1 | 1 | 0 | 1 | 0 | 0 | 0 | Select 8 - MEMOVE |

TABLE II-continued

OUTPUT #1 ROM

| HEX ADDRESS | ADDRESS CODE INPUTS | | | | | | | | OUTPUTS | | | | COMMENTS |
|---|---|---|---|---|---|---|---|---|---|---|---|---|---|
| | INA | INB | CYC | STATE | | | | | OUT | STEP | JMP | DATA | |
| | A | B | C | D | E | F | G | H | Y1 | Y2 | Y3 | Y4 | |
| 6C,6D | 0/1 | 0 | 1 | 1 | 0 | 1 | 1 | 0 | 0 | 0 | 0 | 1 | Select 1 - RDYSET |
| 6A,6B,6E,6F | 0/1 | 1 | 0/1 | 1 | 0 | 1 | 1 | 0 | 0 | 0 | 1 | 0 | Select 2 - CMP BU |
| 70 → 73 | 0/1 | 1 | 1 | 0 | 1 | 1 | 1 | 0 | 1 | 1 | 0 | 0 | Select 12 - GOTXR |
| 74 → 77 | 0/1 | 0/1 | 1 | 0 | 1 | 1 | 1 | 0 | 1 | 1 | 0 | 0 | Select 12 - RETRY CLR |
| 78 → 7F | 0/1 | 0/1 | 0/1 | 1 | 1 | 1 | 1 | 0 | 1 | 0 | 0 | 1 | Select 9 - Volt 5 |
| 80 → 85,87 | 0/1 | 0/1 | 0/1 | 0 | 0 | 0 | 0 | 1 | 1 | 1 | 1 | 1 | No select |
| 86 | 0 | 1 | 1 | 0 | 0 | 0 | 0 | 1 | 0 | 0 | 0 | 1 | Select 1 - RDYSET |
| 88 → 8F | 0/1 | 0/1 | 0/1 | 1 | 0 | 0 | 0 | 1 | 1 | 0 | 1 | 0 | Select 10 - 11 Volt |
| 90,92,94,96 | 0 | 0/1 | 0/1 | 0 | 1 | 0 | 0 | 1 | 0 | 0 | 1 | 1 | Select 3 - Timer |
| 91 & 93 | 1 | 0/1 | 0 | 0 | 1 | 0 | 0 | 1 | 0 | 0 | 1 | 1 | Select 3 - Timer |
| 95 & 97 | 1 | 0/1 | 1 | 0 | 1 | 0 | 0 | 1 | 1 | 1 | 1 | 1 | Nosel |
| 98,9A | 0 | 0/1 | 0 | 1 | 1 | 0 | 0 | 1 | 1 | 1 | 1 | 1 | Nosel |
| 9C,9E | 0 | 0/1 | 1 | 1 | 1 | 0 | 0 | 1 | 0 | 0 | 1 | 1 | Select 3 - Timer |
| 99,9B,9D,9F | 1 | 0/1 | 0/1 | 1 | 1 | 0 | 0 | 1 | 1 | 1 | 1 | 1 | Nosel |
| A0 → A7 | 0/1 | 0/1 | 0/1 | 0 | 0 | 1 | 0 | 1 | 1 | 0 | 1 | 0 | Select 10 - 11 Volt |
| A8,AA | 0 | 0/1 | 0 | 1 | 0 | 1 | 0 | 1 | 1 | 1 | 1 | 1 | Nosel |
| AC,AE | 0 | 0/1 | 1 | 1 | 0 | 1 | 0 | 1 | 0 | 0 | 1 | 1 | Select - Timer |
| 9,AB,AD,AF | 1 | 0/1 | 0/1 | 1 | 0 | 1 | 0 | 1 | 1 | 1 | 1 | 1 | Nosel |
| B0 → B7 | 0/1 | 0/1 | 0/1 | 0 | 1 | 1 | 0 | 1 | 1 | 0 | 1 | 0 | Select 10 - 11 Volt |
| B8 → BF | 0/1 | 0/1 | 0/1 | 1 | 1 | 1 | 0 | 1 | 1 | 1 | 1 | 1 | Nosel |
| C0,C2,C4,C6 | 0 | 0/1 | 0/1 | 0 | 0 | 0 | 1 | 1 | 1 | 1 | 0 | 0 | Select 12 - Retry Clr |
| C1,C3,C5,C7 | 1 | 0/1 | 0/1 | 0 | 0 | 0 | 1 | 1 | 1 | 0 | 1 | 1 | Select 11 - Retry Clk |
| C8,C9,CC,CD | 0/1 | 0 | 0/1 | 1 | 0 | 0 | 1 | 1 | 1 | 0 | 0 | 1 | Select 9 - 5 Volt VCC |
| CA,CB,CE,CF | 0/1 | 1 | 0/1 | 1 | 0 | 0 | 1 | 1 | 1 | 1 | 1 | 1 | No Select |
| D0 → D7 | 0/1 | 0/1 | 0/1 | 0 | 1 | 0 | 1 | 1 | 1 | 0 | 0 | 1 | Select 9 - 5 Volt |
| D8 → DF | 0/1 | 0/1 | 0/1 | 1 | 1 | 0 | 1 | 1 | 1 | 0 | 0 | 1 | Select 9 - 5 Volt VCC |
| E0,E3,E4,E7 | 0/1 | 0/1 | 0/1 | 0 | 0 | 1 | 1 | 1 | 1 | 1 | 1 | 1 | No Select |
| E1,E2,E5,E6 | 1/0 | 0/1 | 0/1 | 0 | 0 | 1 | 1 | 1 | 0 | 0 | 0 | 1 | Select 1 - RDYSET |
| E8,E9,EC,ED | 0/1 | 0 | 0/1 | 1 | 0 | 1 | 1 | 1 | 1 | 1 | 1 | 1 | No Select |
| EA,EB | 0/1 | 1 | 0 | 1 | 0 | 1 | 1 | 1 | 1 | 1 | 1 | 0 | Select 14 - CMPL 2 |
| EE,EF | 0/1 | 1 | 1 | 1 | 0 | 1 | 1 | 1 | 0 | 0 | 0 | 1 | Select 1 - RDYSET |

TABLE III

OUTPUT #2 ROM

| HEX ADDRESS | ADDRESS CODE INPUTS | | | | | | | | OUTPUTS | | | | COMMENTS |
|---|---|---|---|---|---|---|---|---|---|---|---|---|---|
| | INA | INB | CYC | STATE | | | | | C | B | A | JA4 | |
| | A | B | C | D | E | F | G | H | Y1 | Y2 | Y3 | Y4 | |
| 0 → 7 | 0/1 | 0/1 | 0/1 | 0 | 0 | 0 | 0 | 0 | 1 | 1 | 1 | 1 | |
| 8,B,C,F | 0 | 0 | 0/1 | 1 | 0 | 0 | 0 | 0 | 1 | 1 | 1 | 1 | |
| 9 & D | 1 | 0 | 0/1 | 1 | 0 | 0 | 0 | 0 | 1 | 1 | 1 | 0 | JA = 3 |
| A | 0 | 1 | 0 | 1 | 0 | 0 | 0 | 0 | 0 | 0 | 1 | 0 | Select 1 - MACCLR, JA = 9 |
| E | 0 | 1 | 1 | 1 | 0 | 0 | 0 | 0 | 0 | 0 | 0 | 0 | Select 0 - Size Bus, JA = 9 |
| 10 & 14 | 0 | 0 | 0/1 | 0 | 1 | 0 | 0 | 0 | 1 | 1 | 1 | 0 | JA = 0 |
| 12 & 16 | 0 | 1 | 0/1 | 0 | 1 | 0 | 0 | 0 | 0 | 0 | 0 | 0 | Select 0 - Size Bus JA = 1 |
| 11,13,15,17 | 1 | 0/1 | 0/1 | 0 | 1 | 0 | 0 | 0 | 1 | 1 | 1 | 0 | JA = 3 |
| 18 → 1F | 0/1 | 0/1 | 0/1 | 1 | 1 | 0 | 0 | 0 | 0 | 0 | 0 | 0 | Select 0 - Size Bus Tmer = 19MS |
| 20,21,24,25 | 0/1 | 0 | 0/1 | 0 | 0 | 1 | 0 | 0 | 0 | 0 | 1 | 1 | Select 1 - MACCLR |
| 22 & 26 | 0 | 1 | 0/1 | 0 | 0 | 1 | 0 | 0 | 1 | 1 | 1 | 0 | JA = 0 |
| 23 & 27 | 1 | 1 | 0/1 | 0 | 0 | 1 | 0 | 0 | 1 | 1 | 1 | 1 | |
| 28 & 2C | 0 | 0 | 0/1 | 1 | 0 | 1 | 0 | 0 | 1 | 1 | 1 | 0 | JA = 0 |
| 29,2A,2B,2D,2E,2F | 0/1 | 0/1 | 0/1 | 1 | 0 | 1 | 0 | 0 | 1 | 1 | 1 | 1 | |
| 30 → 37 | 0/1 | 0/1 | 0/1 | 0 | 1 | 1 | 0 | 0 | 1 | 1 | 1 | 1 | |
| 38,39,3C,3D | 0/1 | 0 | 0/1 | 1 | 1 | 1 | 0 | 0 | 1 | 1 | 1 | 1 | |
| 3A,3E | 0 | 1 | 0/1 | 1 | 1 | 1 | 0 | 0 | 1 | 1 | 1 | 0 | JA = 0 |
| 3B | 1 | 1 | 0 | 1 | 1 | 1 | 0 | 0 | 1 | 0 | 1 | 0 | Select 5 - SORCLR, JA = 2 |
| 3F | 1 | 1 | 1 | 1 | 1 | 1 | 0 | 0 | 1 | 1 | 1 | 0 | JA = 2, No Select |
| 40,44 | 0 | 0 | 0/1 | 0 | 0 | 0 | 1 | 0 | 1 | 1 | 1 | 0 | JA = 0 |
| 41,43,45,47 | 1 | 0/1 | 0/1 | 0 | 0 | 0 | 1 | 0 | 1 | 1 | 1 | 0 | JA = 1 |
| 42,46 | 0 | 1 | 0/1 | 0 | 0 | 0 | 1 | 0 | 1 | 0 | 1 | 0 | Select 5 - SORCLR, JA = 2 |
| 48 → 4F | 0/1 | 0/1 | 0/1 | 1 | 0 | 0 | 1 | 0 | 0 | 1 | 0 | 1 | Select 2 - PROM EN |
| 50 → 57 | 0/1 | 0/1 | 0/1 | 0 | 1 | 0 | 1 | 0 | 0 | 0 | 0 | 1 | Select 0 - Size Bus |
| 58 → 5F | 0/1 | 0/1 | 0/1 | 1 | 1 | 0 | 1 | 0 | 0 | 1 | 1 | 1 | Select 3 - MACCLK |
| 60,61,64,65 | 0/1 | 0 | 0/1 | 0 | 0 | 1 | 1 | 0 | 1 | 1 | 1 | 0 | JA = 1 |
| 62,63,66,67 | 0/1 | 1 | 0/1 | 0 | 0 | 1 | 1 | 0 | 1 | 0 | 1 | 1 | Select 5 - SORCLR |
| 68,69,6C,6D | 0/1 | 0 | 0/1 | 1 | 0 | 1 | 1 | 0 | 1 | 1 | 1 | 0 | JA = 0 |
| 6A,6B,6E,6F | 0/1 | 1 | 0/1 | 1 | 0 | 1 | 1 | 0 | 0 | 0 | 1 | 1 | Select 1 - MACCLR |
| 70 → 77 | 0/1 | 0/1 | 0/1 | 0 | 1 | 1 | 1 | 0 | 1 | 1 | 1 | 1 | |
| 78 → 7B | 0/1 | 0/1 | 0 | 1 | 1 | 1 | 1 | 0 | 0 | 0 | 0 | X | Select 0 - Size Bus |
| 70 → 7F | 0/1 | 0/1 | 1 | 1 | 1 | 1 | 1 | 0 | 0 | 1 | 0 | X | Select 2 - PROM EN |
| 80,83 | 0/1 | 0 | 0/1 | 0 | 0 | 0 | 0 | 1 | 0 | 1 | 1 | 1 | Select 3 - MACCLK |
| 81,85 | 1 | 0 | 0/1 | 0 | 0 | 0 | 0 | 1 | 0 | 1 | 0 | 1 | Select 2 - PROM EN |
| 82,86 | 0 | 1 | 0/1 | 0 | 0 | 0 | 0 | 1 | 1 | 0 | 0 | 0 | Select 4 - PROM FAILURE |
| 84,87 | 0/1 | 1 | 1 | 0 | 0 | 0 | 0 | 1 | 1 | 1 | 1 | 1 | No Select |
| 88 → 8F | 0/1 | 0/1 | 0/1 | 1 | 0 | 0 | 0 | 1 | 1 | 1 | 1 | 1 | |
| 90,92,94,96 | 0 | 0/1 | 0/1 | 0 | 1 | 0 | 0 | 1 | 0 | 1 | 0 | 0 | Select 2 - PROM EN Timer = 1MS |

TABLE III-continued

| | OUTPUT #2 ROM | | | | | | | | | | | | |
|---|---|---|---|---|---|---|---|---|---|---|---|---|---|
| | ADDRESS CODE INPUTS | | | | | | | | OUTPUTS | | | | |
| HEX | INA | INB | CYC | STATE | | | | | C | B | A | JA4 | |
| ADDRESS | A | B | C | D | E | F | G | H | Y1 | Y2 | Y3 | Y4 | COMMENTS |
| 91,93 | 1 | 0/1 | 0 | 0 | 1 | 0 | 0 | 1 | 0 | 1 | 0 | 0 | Select 2 - PROM En Timer = 1MS |
| 95,97 | 1 | 0/1 | 1 | 0 | 1 | 0 | 0 | 1 | 1 | 1 | 1 | 1 | JA = 21, No select |
| 98,9A | 0 | 0/1 | 0 | 1 | 1 | 0 | 0 | 1 | 0 | 1 | 0 | 0 | Select 2 - PROM En |
| 9C,9E | 0 | 0/1 | 1 | 1 | 1 | 0 | 0 | 1 | 1 | 1 | 1 | 0 | Timer = 9MS |
| 99,9B,9D,9F | 1 | 0/1 | 0/1 | 1 | 1 | 0 | 0 | 1 | 1 | 1 | 1 | 1 | |
| A0 → A7 | 0/1 | 0/1 | 0/1 | 0 | 0 | 1 | 0 | 1 | 1 | 1 | 1 | 1 | JA = 23 |
| A8,AA | 0 | 0/1 | 0 | 1 | 0 | 1 | 0 | 1 | 0 | 1 | 0 | 1 | Select 2 - PROM En |
| AC,AE | 0 | 0/1 | 1 | 1 | 0 | 1 | 0 | 1 | 1 | 1 | 1 | 1 | Timer = 451 MS |
| A9,AB,AD,AF | 1 | 0/1 | 0/1 | 1 | 0 | 1 | 0 | 1 | 1 | 1 | 1 | 1 | |
| B0 → B7 | 0/1 | 0/1 | 0/1 | 0 | 1 | 1 | 0 | 1 | 1 | 1 | 1 | 1 | |
| B8 → BF | 0/1 | 0/1 | 0/1 | 1 | 1 | 1 | 0 | 1 | 0 | 1 | 0 | 1 | Select PROM En |
| C0,C2,C4,C6 | 0 | 0/1 | 0/1 | 0 | 0 | 0 | 1 | 1 | 0 | 1 | 1 | 1 | Select MACCLK, JA = 26 |
| C1,C3,C5,C7 | 1 | 0/1 | 0/1 | 0 | 0 | 0 | 1 | 1 | 0 | 0 | 1 | 1 | Select 1 - MACCLR |
| CA,CB,CE,CF | 0/1 | 1 | 0/1 | 1 | 0 | 0 | 1 | 1 | 0 | 0 | 1 | 1 | Select 1 - MACCLR |
| C8,C9,CC,CD | 0/1 | 0 | 0/1 | 1 | 0 | 0 | 1 | 1 | 1 | 1 | 1 | 1 | No Select |
| D0 → D7 | 0/1 | 0/1 | 0/1 | 0 | 1 | 0 | 1 | 1 | 0 | 1 | 0 | X | Select 2 - PROM En |
| D8D9DBDCDDDF | 0/1 | 0/1 | 0/1 | 1 | 1 | 0 | 1 | 1 | 1 | 1 | 1 | 0 | No Select |
| DA | 0 | 1 | 0 | 1 | 1 | 0 | 1 | 1 | 0 | 0 | 1 | X | Select 1 - MACCLR |
| DE | 0 | 1 | 1 | 1 | 1 | 0 | 1 | 1 | 0 | 1 | 0 | X | Select 2 - PROM En |
| E0,E3,E4,E7 | 0/1 | 0/1 | 0/1 | 0 | 0 | 1 | 1 | 1 | 0 | 1 | 1 | 0 | Select 3 - MACCLK |
| E1,E2,E5,E6 | 0/1 | 0/1 | 0/1 | 0 | 0 | 1 | 1 | 1 | 1 | 0 | 0 | 0 | Select 4 - PROM Failure |
| E8,E9,EC,ED | 0/1 | 0 | 0/1 | 1 | 0 | 1 | 1 | 1 | 1 | 1 | 1 | 1 | No select |
| EA,EB,EE,E7 | 0/1 | 1 | 0/1 | 1 | 0 | 1 | 1 | 1 | 1 | 1 | 1 | 0 | No Select |

TABLE IV

| | JUMP/TIMER ROM | | | | | | | | | | | | |
|---|---|---|---|---|---|---|---|---|---|---|---|---|---|
| | ADDRESS CODE INPUTS | | | | | | | | OUTPUTS | | | | |
| HEX | INA | INB | CYC | STATE | | | | | JA3 | JA2 | JA1 | JA0 | |
| ADDRESS | A | B | C | D | E | F | G | H | Y1 | Y2 | Y3 | Y4 | COMMENTS |
| 0 → 7 | 0/1 | 0/1 | 0/1 | 0 | 0 | 0 | 0 | 0 | 1 | 1 | 1 | 1 | |
| 8 & C | 0 | 0 | 0/1 | 1 | 0 | 0 | 0 | 0 | 1 | 1 | 1 | 1 | |
| 9 & D | 1 | 0 | 0/1 | 1 | 0 | 0 | 0 | 0 | 0 | 0 | 1 | 1 | JA = 3 |
| A & E | 0 | 1 | 0/1 | 1 | 0 | 0 | 0 | 0 | 1 | 0 | 0 | 1 | JA = 9 |
| B & F | 1 | 1 | 0/1 | 1 | 0 | 0 | 0 | 0 | 1 | 1 | 1 | 1 | |
| 10 & 14 | 0 | 0 | 0/1 | 0 | 1 | 0 | 0 | 0 | 0 | 0 | 0 | 0 | JA = 0 |
| 11,13,15,17 | 1 | 0/1 | 0/1 | 0 | 1 | 0 | 0 | 0 | 0 | 0 | 1 | 1 | Timer = 11MS |
| 12,16 | 0 | 1 | 0/1 | 0 | 1 | 0 | 0 | 0 | 1 | 1 | 0 | 1 | JA = 13 |
| 18,19,1C,1D | 0/1 | 0 | 0/1 | 1 | 1 | 0 | 0 | 0 | 0 | 0 | 0 | 0 | JA = 0 |
| 1A,1B,1E,1F | 0/1 | 1 | 0/1 | 1 | 1 | 0 | 0 | 0 | 0 | 1 | 0 | 1 | Timer = 19MS |
| 20,21,24,25 | 0/1 | 0 | 0/1 | 0 | 0 | 1 | 0 | 0 | 1 | 1 | 1 | 1 | |
| 22 & 26 | 0 | 1 | 0/1 | 0 | 0 | 1 | 0 | 0 | 0 | 0 | 0 | 0 | JA = 0 |
| 23 & 27 | 1 | 1 | 0/1 | 0 | 0 | 1 | 0 | 0 | 1 | 1 | 1 | 1 | |
| 28 & 2C | 0 | 0 | 0/1 | 1 | 0 | 1 | 0 | 0 | 0 | 0 | 0 | 0 | JA = 0 |
| 292A2B2D2E2F | 0/1 | 0/1 | 0/1 | 1 | 0 | 1 | 0 | 0 | 1 | 1 | 1 | 1 | |
| 30 → 37 | 0/1 | 0/1 | 0/1 | 0 | 1 | 1 | 0 | 0 | 1 | 1 | 1 | 1 | |
| 38,39,3C,3D | 0/1 | 0 | 0/1 | 1 | 1 | 1 | 0 | 0 | 1 | 1 | 1 | 1 | |
| 3A,3E | 0 | 1 | 0/1 | 1 | 1 | 1 | 0 | 0 | 0 | 0 | 0 | 0 | JA = 0 |
| 3B,3F | 1 | 1 | 0/1 | 1 | 1 | 1 | 0 | 0 | 0 | 0 | 1 | 0 | JA = 2 |
| 40,44 | 0 | 0 | 0/1 | 0 | 0 | 0 | 1 | 0 | 0 | 0 | 0 | 0 | JA = 0 |
| 41,43,45,47 | 1 | 0/1 | 0/1 | 0 | 0 | 0 | 1 | 0 | 0 | 0 | 0 | 1 | JA = 1 |
| 42,46 | 0 | 1 | 0/1 | 0 | 0 | 0 | 1 | 0 | 0 | 0 | 1 | 0 | JA = 2 |
| 48 → 4F | 0/1 | 0/1 | 0/1 | 1 | 0 | 0 | 1 | 0 | 1 | 1 | 1 | 1 | |
| 50 → 57 | 0/1 | 0/1 | 0/1 | 0 | 1 | 0 | 1 | 0 | 1 | 1 | 1 | 1 | |
| 58 → 5F | 0/1 | 0/1 | 0/1 | 1 | 1 | 0 | 1 | 0 | 1 | 1 | 1 | 1 | |
| 60,61,64,65 | 0/1 | 0 | 0/1 | 0 | 0 | 1 | 1 | 0 | 0 | 0 | 0 | 1 | JA = 1 |
| 62,63,66,67 | 0/1 | 1 | 0/1 | 0 | 0 | 1 | 1 | 0 | 0 | 0 | 1 | 0 | JA = 2 |
| 68,69,6C,6D | 0/1 | 0 | 0/1 | 1 | 0 | 1 | 1 | 0 | 0 | 0 | 0 | 0 | JA = 0 |
| 6A,6B,6E,6F | 0/1 | 1 | 0/1 | 1 | 0 | 1 | 1 | 0 | 1 | 1 | 1 | 1 | |
| 70 → 77 | 0/1 | 0/1 | 0/1 | 0 | 1 | 1 | 1 | 0 | 1 | 1 | 1 | 1 | |
| 78 → 7F | 0/1 | 0/1 | 0/1 | 1 | 1 | 1 | 1 | 0 | 1 | 1 | 1 | 1 | |
| 80,83,84,87 | 0/1 | 0/1 | 0/1 | 0 | 0 | 0 | 0 | 1 | 1 | 0 | 1 | 0 | JA = 26 |
| 81,82,85,86 | 0/1 | 0/1 | 0/1 | 0 | 0 | 0 | 0 | 1 | 0 | 0 | 0 | 0 | JA = 0 |
| 88 → 8F | 0/1 | 0/1 | 0/1 | 1 | 0 | 0 | 0 | 1 | 1 | 1 | 1 | 1 | |
| ,92,94,96 | 0 | 0/1 | 0/1 | 0 | 1 | 0 | 0 | 1 | 0 | 0 | 0 | 0 | Timer = 1MS |
| 91 & 93 | 1 | 0/1 | 0 | 0 | 1 | 0 | 0 | 1 | 1 | 1 | 0 | 1 | Timer = 51MS |
| 95 & 97 | 1 | 0/1 | 1 | 0 | 1 | 0 | 0 | 1 | 0 | 0 | 0 | 1 | JA = 21 |
| 98,9A,9C,9E | 0 | 0/1 | 0/1 | 1 | 1 | 0 | 0 | 1 | 0 | 0 | 1 | 0 | Timer = 9MS |
| 9B,9D,9F | 1 | 0/1 | 0/1 | 1 | 1 | 0 | 0 | 1 | 1 | 1 | 1 | 1 | |
| A0 → A7 | 0/1 | 0/1 | 0/1 | 0 | 0 | 1 | 0 | 1 | 0 | 1 | 1 | 1 | JA = 23 |
| | 0 | 0/1 | 0/1 | 1 | 0 | 1 | 0 | 1 | 0 | 0 | 0 | 1 | Timer = 415MS |
| | 1 | 0/1 | 0/1 | 1 | 0 | 1 | 0 | 1 | 1 | 1 | 1 | 1 | |
| | 0/1 | 0/1 | 0/1 | 0 | 1 | 1 | 0 | 1 | 1 | 1 | 1 | 1 | |
| B8 → BF | 0/1 | 0/1 | 0/1 | 1 | 1 | 1 | 0 | 1 | 1 | 1 | 1 | 1 | |
| C0,C2,C4,C6 | 0 | 0/1 | 0/1 | 0 | 0 | 0 | 1 | 1 | 1 | 0 | 1 | 0 | JA = 26 |
| C1,C3,C5,C7 | 1 | 0/1 | 0/1 | 0 | 0 | 0 | 1 | 1 | 1 | 1 | 0 | 0 | JA = 28 |

TABLE IV-continued

| HEX ADDRESS | JUMP/TIMER ROM ADDRESS CODE INPUTS | | | | | | | | OUTPUTS | | | | COMMENTS |
|---|---|---|---|---|---|---|---|---|---|---|---|---|---|
| | INA | INB | CYC | STATE | | | | | JA3 | JA2 | JA1 | JA0 | |
| | A | B | C | D | E | F | G | H | Y1 | Y2 | Y3 | Y4 | |
| C8 → CF | 0/1 | 0/1 | 0/1 | 1 | 0 | 0 | 1 | 1 | 1 | 1 | 0 | 0 | JA = 28 |
| D0 → D7 | 0/1 | 0/1 | 0/1 | 0 | 1 | 0 | 1 | 1 | 1 | 1 | 1 | 1 | |
| D8 → DF | 0/1 | 0/1 | 0/1 | 1 | 1 | 0 | 1 | 1 | 1 | 1 | 1 | 1 | JA = 15 |
| E0 → E7 | 0/1 | 0/1 | 0/1 | 0 | 0 | 1 | 1 | 1 | 0 | 0 | 0 | 0 | JA = 0 |
| E8,E9,EC,ED | 0/1 | 0 | 0/1 | 1 | 0 | 1 | 1 | 1 | 1 | 1 | 0 | 0 | JA = 28 |
| EA,EB,EE,EF | 0/1 | 1 | 0/1 | 1 | 0 | 1 | 1 | 1 | 0 | 0 | 0 | 0 | JA = 0 |

Various embodiments of the PROM programmer system of the present invention have now been described in detail. Since it is obvious that many additional changes and modification can be made in the above described details without departing from the nature and spirit of the invention, it is understood that the invention is not to be limited to said details except as set forth in the appended claims.

What is claimed is:

1. A system for programming a plurality of integrated programmable read-only memory circuits each of said integrated circuit including a plurality of single-bit storage cells, address means for addressing said single-bit storage cells, data receiving means for receiving single bits of data to be non-volatilely stored in address storage cells and data output means for reading single bits of data from addressed storage cells, said system comprising:
   (a) means for providing sets of data for non-volatile storage in the integrated read-only memory circuits;
   (b) memory address generating means for generating cell addresses, in predetermined sequences, for the address means of each of said integrated memory circuits;
   (c) means for coupling said memory address generating means to the address means of each of said integrated memory circuits;
   (d) chip select means for generating signals to select and enable one-at-a-time said integrated memory circuits in a predetermined sequence;
   (e) means for coupling said chip select means to said integrated memory circuits;
   (f) comparator means;
   (g) means for coupling said comparator means to the outputs of said integrated memory circuits, said comparator means for receiving bits of data from addressed memory cells of enabled ones of said integrated memory circuits and comparing such received bits of data with respective bits of data of said sets of data to determine whether the compared bits are of states which meet predetermined criteria; and
   (h) means responsive to said comparator means for selectively supplying a programming voltage to the integrated memory circuit selected by said chip select means to non-volatilely alter the state of the addressed single-bit storage cell thereof when the bits of data compared by said comparator means do not meet said predetermined criteria.

2. A system according to claim 1 including clocking means coupled to said memory address generating means for incrementing said address generating means in said predetermined sequence to completely store said sets of data in said integrated read-only memory circuits.

3. A system according to claim 1 wherein said means for supplying a programming voltage is coupled to said chip select means wherein said programming voltage is supplied to the selected read-only memory circuit by means of said chip select means.

4. A system according to claim 1 wherein said means for providing sets of data for permanent storage in the integrated read-only memory circuits includes an addressable buffer memory means.

5. A system according to claim 4 wherein said buffer memory means is coupled to said memory address generating for being addressed in synchronism with said integrated read-only memory circuits.

6. A system for programming a plurality of integrated programmable read-only memory circuits, each of said integrated circuits including a plurality of single-bit storage cells, address means for addressing said single-bit storage cells, data receiving means for receiving single bits of data to be non-volatilely stored in addressed storage cells and data output means for reading single bits of data from addressed storage cells, said system comprising:
   (a) means for providing sets of data for non-volatile storage in the integrated read-only memory circuits;
   (b) memory address generating means for generating cell addresses, in a predetermined sequence, for the address means of each of said integrated memory circuits;
   (c) means for coupling said memory address generating means to the address means of each of said integrated memory circuits;
   (d) a controllable dual voltage supply means for selectively providing, at an output thereof, a relatively high programming voltage sufficient to non-volatilely alter the state of an addressed storage cell of said integrated read-only memory circuits and, alternately, a relatively low read voltage;
   (e) chip select means for generating signals to select and enable one-at-a-time said integrated memory circuits in a predetermined sequence, said chip select means being coupled to the output of said controlled dual voltage supply for supplying the selected voltage to the selected one of said integrated read-only memory circuits;
   (f) means for coupling said chip select means to said integrated memory circuits;
   (g) comparator means;
   (h) means for coupling said comparator means to the outputs of said integrated memory circuits, said comparator means for receiving bits of data from addressed memory cells of integrated memory circuits enabled with said relatively low read voltage via said chip select means and comparing such received bits with respective bits of said sets of data to determine whether the compared bits are of states which meet a predetermined criteria; and (i) means responsive to said comparator means for controlling said controllable dual voltage supply means to supply said relatively high programming voltage to the selected one of said integrated memory circuits for non-volatilely altering the state of the addressed single bit storage cell thereof when the bits of data compared by said comparator means do not meet said predetermined criteria.

7. A system according to claim 6 wherein said means for providing sets of data includes an addressable buffer memory means.

8. A system according to claim 7 wherein said buffer memory means is coupled to said address generating means for being addressed in synchronism with said integrated read-only memory circuits.

9. A system according to claim 6 including means coupled to said controllable dual voltage supply for controlling said voltage supply to provide said relatively low read voltage to said addressed single-bit storage cell after the state of said cell has been non-volatilely altered thereby checking said cell to ensure that it has been correctly programmed.

10. A system for copying the contents of a volatile memory into a non-volative memory, said non-volatile memory being comprised of a plurality of integrated programmable read-only memory circuits, each of said integrated circuits including a plurality of single-bit storage cells, address means for addressing said single-bit storage cells, data receiving means for receiving single bits of data from addressed storage cells, said system comprising:

(a) an addressable buffer memory means;

(b) memory address generating means for generating respective addresses of said volatile memory means, said buffer memory means and said integrated read-only memory circuits;

(c) data bus means for coupling said volatile memory means to said buffer memory means;

(d) means for coupling said memory address generating means to said volatile memory and to said buffer memory means for controlling the addressing of said buffer memory means in synchronism with the addressing of said volatile memory, the contents of addressed locations of said volatile memory being transferrable over said data bus means into addressed locations of said buffer memory means;

(e) means including chip select means for coupling said address generating means to said integrated read-only memory circuits, said chip select means being responsive to said address generating means for selecting and enabling one-at-a-time said integrated memory circuits in a predetermined sequence and said address means being responsive to said address generating means for addressing single bit storage cells of each of said integrated memory circuits in a predetermined sequence, said programmable read-only memory circuits being thereby addressable in synchronism with the addressing of said buffer memory means for transferring the contents of said buffer memory means into said programmable read-only memory means; and (f) means for selectively supplying a read voltage and a programming voltage to the integrated read-only memory circuit selected by said chip select means, said read voltage to read the contents of the addressed single-bit storage cell without altering the state thereof and said programming voltage to non-volatilely alter the state of the addressed single-bit storage cell.

11. A system according to claim 10 wherein said volatile memory is a random access memory means of an industrial controller.

* * * * *